(12) United States Patent
Johnson et al.

(10) Patent No.: US 6,748,218 B1
(45) Date of Patent: Jun. 8, 2004

(54) WIRELESS COMMUNICATION METHODS AND SYSTEMS USING MULTIPLE SECTORED CELLS

(75) Inventors: Thomas J. Johnson, Bedford, NH (US); Christopher M. Moritz, Manchester, NH (US); Daniel Harrison, Litchfield, NH (US)

(73) Assignee: Remec, Inc., Del Mar, CA (US)

( * ) Notice: Subject to any disclaimer, the term of this patent is extended or adjusted under 35 U.S.C. 154(b) by 0 days.

(21) Appl. No.: 09/546,060

(22) Filed: Apr. 10, 2000

(51) Int. Cl.$^7$ ................................................. H04Q 7/20
(52) U.S. Cl. ..................... 455/446; 455/562.1; 455/13.3
(58) Field of Search ................................. 455/422, 434, 455/436, 443, 446, 447, 450, 439, 452, 13.3, 62, 63, 703, 561, 562, 449; 342/368, 457, 450

(56) References Cited

U.S. PATENT DOCUMENTS

| | | | |
|---|---|---|---|
| 4,144,496 A | 3/1979 | Cunningham et al. | 325/53 |
| 5,067,147 A | 11/1991 | Lee | |
| 5,073,971 A | 12/1991 | Schaeffer | 455/33 |
| 5,365,571 A | 11/1994 | Rha et al. | |
| 5,561,842 A | 10/1996 | Ritter et al. | 455/33.1 |
| 5,596,333 A | 1/1997 | Bruckert | |
| 5,613,200 A | 3/1997 | Hamabe | |
| 5,649,292 A | 7/1997 | Doner | 455/447 |
| 5,678,187 A | 10/1997 | Meidan et al. | |
| 5,713,072 A * | 1/1998 | Marth et al. | 455/410 |
| 5,838,670 A | 11/1998 | Billstrom | 370/328 |
| 5,867,485 A | 2/1999 | Chambers et al. | 370/281 |
| 5,890,066 A | 3/1999 | Levin | 455/446 |
| 5,901,356 A | 5/1999 | Hudson | 455/451 |
| 5,903,826 A | 5/1999 | Nowak | 455/277.1 |
| 5,966,670 A | 10/1999 | Keskitalo et al. | |
| 5,974,324 A | 10/1999 | Henson | 455/447 |
| 5,978,650 A | 11/1999 | Fischer et al. | 455/3.1 |
| 6,006,069 A | 12/1999 | Langston | 455/62 |
| 6,052,582 A | 4/2000 | Blasing et al. | 455/422 |
| 6,078,814 A | 6/2000 | Jeffries et al. | |
| 6,101,174 A | 8/2000 | Langston | 370/312 |
| 6,112,056 A | 8/2000 | Langston | 455/62 |
| 6,128,497 A | 10/2000 | Faruque | |
| 6,181,955 B1 | 1/2001 | Dartois | |
| 6,418,327 B1 * | 7/2002 | Carey et al. | 455/422 |

FOREIGN PATENT DOCUMENTS

| | | |
|---|---|---|
| EP | 0 429 200 A2 | 5/1991 |
| EP | 0 926 844 A2 | 6/1999 |
| WO | WO 98/01922 | 1/1998 |
| WO | WO 98/53633 A1 | 11/1998 |

OTHER PUBLICATIONS

Co-pending U.S. Patent application, Ser. No. 09/596,656, filed Jun. 19, 2000, Lakshman S. Tamil, Aubrey I. Chapman, and Douglas Carey, "Focused Narrow Beam Communication System".

(List continued on next page.)

Primary Examiner—Jean Gelin
(74) Attorney, Agent, or Firm—Wolf, Greenfield & Sacks, P.C.

(57) ABSTRACT

Wireless communication methods and systems using multiple sectored cells. In one example, each cell of a cellular coverage area is divided into a number of sectors. A number of different half duplex or full duplex channels are used in each cell to communicate between a base station and a number of subscriber stations located in the cell. At least some of the channels may be reused in other cells of the coverage area. Additionally, some channels may be reused both amongst sectors of a given cell and in other cells of the coverage area. The sectored cells are arranged with respect to one other such that interference amongst similarly oriented sectors of different cells using one or more same channels is reduced. In another example, two adjacent cells are arranged with respect to each other such that sectors of the two cells that are similarly oriented approximately along a bore axis of the two cells, and in which radiation is transmitted in the two cells in essentially a same direction approximately along the bore axis, use different channels.

70 Claims, 16 Drawing Sheets

OTHER PUBLICATIONS

Co-pending U.S. Patent application, Ser. No. 09/345,916, filed Jun. 30, 1999, Lakshman S. Tamil, Aubrey I. Chapman, and Douglas Carey, "Focused Narrow Beam Communication System".

Co-pending U.S. Patent application, Ser. No. 08/677,413, filed Jun. 2, 1998, Lakshman S. Tamil, and Aubrey I. Chapman, "Focused Narrow Beam Communication System".

Kin K. Leung and Arty Srivastava, "Dynamic Resource Allocation for Broadband Services in Fixed Wireless Networks," Multiaccess, Mobility and Teletraffic, Advances in Wireless Networks, Proceedings of MMT. Multiaccess, Mobility and Teletraffic for Personal Communication, Dec. 1997, pp. 301–314.

International Search Report from PCT Application PCT/US01/11784.

Co-pending U.S. Patent application, Ser. No. 09/737,511, filed Dec. 15, 2000, Thomas J. Johnson, et al., "Wireless Communication Methods and Systems Using Multiple Overlapping Sectored Cells".

Co-pending U.S. Patent application, Ser. No. 09/852,511, filed May 10, 2001, Thomas J. Johnson, et al., "Wireless Communication Methods and Systems Using Multiple Adjacent Sectored Cells".

"On The Design Of Broadband Fixed Wireless Packet Networks", N.K. Shankaranarayanan and Arty Srivastava, AT&T Laboratories—Research, pp. 1930–1935.

* cited by examiner

WIRELESS COMMUNICATION METHODS AND SYSTEMS USING MULTIPLE SECTORED CELLS

FIELD OF THE INVENTION

The present invention relates to wireless communications, and more particularly, to wireless communication methods and systems using multiple sectored cells.

DESCRIPTION OF THE RELATED ART

The communications industry has long sought increased capacity communication systems that could bring robust communications to the world's population. Much of today's communication traffic is in the form of information carriers that are encoded with digital data representing information to be transported across a communication link. The information transported across the link may often include, for example, voice or video information, as well as textual information or raw data for a particular application.

With the increased use of the Internet and other forms of data communication in recent years, there has been an exponential increase in worldwide data traffic. The increased demand for data communications has essentially outpaced the capacity of existing systems, creating a need for higher capacity communication systems. The capacity of a communication link generally refers to the amount of data that can be reliably transported over the link per unit time and is typically measured in terms of data bits per second (bps).

Wireless communication systems are recognized as an effective method of interconnecting users. Wireless communication systems may be preferable, particularly in geographic locations such as congested urban areas, remote rural areas, or areas having difficult terrains, where it may be difficult and/or cost-prohibitive to deploy wire conductors or fiber optics. Rather than transporting information on carriers over a physically "tangible" communication link such as a wire conductor or fiber optic cable, wireless systems radiate information carriers in "open space" throughout a coverage area. The communication link in wireless systems generally may be defined by the spatial profile of the radiated information carriers.

Generally, the information carriers radiated in wireless communication systems have particular carrier frequencies and predetermined bandwidths within a designated frequency spectrum for a given communication link. In particular, a given information carrier may represent a single channel over which to transport information, or may represent a "channel set" including several channels over which to transport information. For example, a frequency band (i.e., a portion of the designated frequency spectrum) centered around a particular carrier frequency may be divided into a number of smaller bandwidth frequency channels, wherein each channel may carry unique information. Such a scheme commonly is known as Frequency Division Multiple Access (FDMA). Alternatively, an information carrier having a particular carrier frequency may be divided into a number of time slots, wherein each time slot represents a channel that may carry unique information. Such a scheme commonly is known as Time Division Multiple Access (TDMA). Yet other examples of techniques to partition a frequency band into a set of channels include various coding schemes to uniquely identify channels within a set, such as Code Division Multiple Access (CDMA) which uses a unique pseudo-noise digital code (PN code) to encode and decode each channel of a channel set, and various Orthogonal Frequency Division Multiplexing (OFDM) techniques (including VOFDM, COFDM, SC-OFDM, etc.).

Historically, wireless communication systems have found great applicability for communicating with mobile users. Generally, conventional mobile wireless communication systems are designed by dividing a coverage area into a number of cells in a honeycomb-like manner. For purposes of illustration, the cells in the coverage area often are represented as either essentially circular or hexagonal in shape. For purposes of this disclosure, it should be appreciated that one or both of a circular or hexagonal cell shape may be used interchangeably in the drawings to represent a typical cell in a wireless communication system coverage area.

FIGS. 1A and 1B show two examples of common arrangements of cells in a conventional mobile wireless communication system. Generally, it is assumed that each cell in such an arrangement has essentially a same radius and covers an approximately circular area, as shown in FIGS. 1A and 1B. From FIGS. 1A and 1B, it should be readily apparent that each cell in an inner portion of the coverage area is surrounded by 6 other cells.

For wireless communication systems in general, frequency spectrum is a valuable commodity. Typical goals of a wireless communication system designer include reaching as many users as possible via broadband high capacity communication links, and doing so by using as little frequency spectrum as possible. In view of the foregoing, a variety of frequency spectrum reuse plans and cell layouts have been developed, primarily for use in mobile wireless communication systems, to reuse portions of frequency spectrum in a number of cells in a coverage area while attempting to minimize interference amongst cells in which the same frequency spectrum is used. By dividing a coverage area into a number of cells, and reusing portions of frequency spectrum in some of the cells, the information carrying capacity of the reused portions of frequency spectrum is essentially multiplied by the number of cells in which the portions are used.

FIGS. 1A and 1B show two common frequency spectrum reuse plans for conventional mobile wireless communication systems. In each of the cells shown in FIGS. 1A and 1B, radiation (i.e., representing one or more information carriers) is transmitted from approximately the center of the cell in an omnidirectional manner throughout the cell. The radiation transmitted in each cell is allocated a particular frequency band within the allotted frequency spectrum for the system. The cells are arranged relative to one another such that neighboring cells do not use the same frequency band.

FIG. 1A shows a coverage area that employs a frequency spectrum reuse plan using three different frequency bands, A, B, and C. The use of three different frequency bands in the cell arrangement of FIG. 1A insures that no two adjacent cells use the same frequency band. The three different frequency bands each may be reused a number of times to build up the honeycomb pattern of the coverage area shown in FIG. 1A. It is noteworthy in FIG. 1A that, starting from a center cell 20 which uses the frequency band A, the nearest cells $21_1$–$21_6$ which also use the frequency band A are removed from the center cell 20 by one "layer" of intervening cells that surround the center cell 20.

Another possible frequency spectrum reuse plan for the cells of FIG. 1A is to employ different radiation polarizations amongst cells using a same frequency band. For example, the A cells may use a first frequency band having a first polarization, the B cells may re-use the first frequency band with an orthogonal polarization to the first polarization, and the C cells may use a second frequency band. Alternatively, cells using a same frequency band may use different time slots or channel codes, as discussed above, to differentiate the information channels amongst the cells. In view of the foregoing, the designations A, B, and C in FIG. 1A each may refer to one of three different cell "configurations," wherein each cell configuration may be uniquely identified from another cell configuration by at least one of frequency band, polarization, time slot, or channel code, for example. Accordingly, as seen in FIG. 1A, in a coverage area having a honeycomb pattern cell arrangement employing three different cell configurations, a "buffer layer" of one cell is insured between two cells having the same configuration (e.g., using the same frequency band).

FIG. 1B shows a similar honeycomb pattern arrangement of cells in a coverage area employing seven different cell configurations (e.g., seven different frequency bands). In particular, a center cell 22 of FIG. 1B is designated as having a configuration F, while each of six cells surrounding the center cell 22 have a different configuration, namely, A, B, C, D, E, and G. By employing seven different cell configurations in the cell arrangement of FIG. 1B, a buffer layer of two intervening cells having different configurations is insured between two cells having the same configuration, as illustrated by the cells $24_1$–$24_6$ which use the same configuration F as the center cell 22.

Other proposed solutions for increasing the capacity of wireless communication systems have been directed to point-to-multipoint configurations for primarily stationary users in a coverage area. In these configurations, often a coverage area is divided up in a pie-like fashion into a number of wedge-shaped sectors, as shown in FIG. 1C, rather than a honeycomb pattern of cells, as shown in FIGS. 1A and 1B. Such systems typically employ a sectored antenna system, which permits the reuse of frequency spectrum amongst multiple sectors within the coverage area. In the example of FIG. 1C, adjacent sectors of the coverage area use different frequency bands, and alternate sectors use a same pair of carrier frequencies (e.g., F1–F3 for pair A and F2–F4 for pair B) for full duplex (i.e., two way) information channels. By dividing a coverage area into a number of sectors rather than a number of cells, and reusing one or more frequency bands in some of the sectors, the information carrying capacity of the reused frequency bands is essentially multiplied by the number of sectors in which the bands are used.

In sum, frequency spectrum reuse may increase the information carrying capacity of a given "slice" of frequency spectrum in a wireless communication system. However, frequency spectrum reuse typically requires a sufficient degree of isolation amongst cells of a cellular coverage area (as discussed above in connection with FIGS. 1A and 1B), or sectors of a sectored coverage area (as discussed above in connection with FIG. 1C) to insure a relatively error-free exchange of information. For sectored coverage areas in particular, frequency reuse, and therefore increased capacity, may be achieved at the expense of increased isolation amongst the sectors.

SUMMARY OF THE INVENTION

One embodiment of the invention is directed to a wireless communication system, comprising at least three sectored cells. Each cell is divided into at least three sectors and is assigned at least three different channels such that adjacent sectors of the sectors in each cell use different channels. The cells are arranged using at least three different cell configurations, wherein each cell configuration is uniquely identified by at least one of a particular azimuth orientation of the cell about a center of the cell and particular channel types of each different channel of the at least three different channels used in the cell.

Another embodiment of the invention is directed to a wireless communication system, comprising at least two base stations disposed in a coverage area that includes at least two adjacent cells. Each cell includes a respective plurality of subscriber stations and includes at least one base station disposed approximately at a center of the cell to exchange information over air with the respective plurality of subscriber stations. Each cell has approximately a same radius and spans a 360 degree azimuth angle around the base station. The two adjacent cells define at least one bore axis that passes through the center of each cell. The wireless communication system is constructed and arranged such that each cell is divided into at least three sectors. The base station in each cell exchanges information with the respective plurality of subscriber stations using at least three different channels, wherein adjacent sectors of the at least three sectors in each cell use different channels. The two adjacent cells are arranged with respect to each other such that sectors of the two adjacent cells that are similarly oriented approximately along the bore axis and in which radiation is transmitted by the two base stations in essentially a same direction approximately along the bore axis use different channels.

Another embodiment of the invention is directed to a wireless communication system, comprising at least seven base stations disposed in a coverage area that includes at least seven cells. Each cell includes a respective plurality of subscriber stations and includes at least one base station disposed approximately at a center of the cell to exchange information over air with the respective plurality of subscriber stations. Each cell has approximately a same radius and spans a 360 degree azimuth angle around the base station. A first cell of the seven cells is adjacent with each of six other cells such that the six other cells surround the first cell. The seven cells define a plurality of bore axes, each bore axis passing through the center of each of two cells of the seven cells. The wireless communication system is constructed and arranged such that each cell is divided into 6N sectors, N being an integer. The base station in each cell exchanges information with the respective plurality of subscriber stations using at least three different full duplex channels, wherein adjacent sectors of the 6N sectors in each cell use different full duplex channels. The seven cells are arranged with respect to each other such that sectors of adjacent cells that are similarly oriented approximately along one bore axis and in which radiation is transmitted by at least two of the seven base stations in essentially a same direction approximately along the one bore axis use different full duplex channels.

Another embodiment of the invention is directed to a wireless communication system, comprising K different cell configurations, K being an integer not less than three. Each cell configuration of the K different cell configurations includes a cell having 6N sectors, N being an integer. Each cell uses a same set of C different channels to transport information, C being an integer equal to at least K. The K different cell configurations include K different azimuth orientations of the cells with respect to one another.

Another embodiment of the invention is directed to a wireless communication method, comprising acts of dividing a coverage area into at least three cells, dividing each cell of the at least three cells into at least three sectors, and assigning at least three different channels to each cell of the at least three cells such that adjacent sectors of the at least three sectors in each cell use different channels. The method also includes an act of arranging the at least three sectored cells using at least three different cell configurations, each cell configuration of the at least three different cell configurations being uniquely identified by at least one of a particular azimuth orientation of the cell about a center of the cell and particular channel types of each different channel of the at least three different channels used in the cell.

Another embodiment of the invention is directed to a wireless communication method in a wireless communication system including at least two base stations disposed in a coverage area that includes at least two adjacent cells. Each cell includes a respective plurality of subscriber stations and includes at least one base station disposed approximately at a center of the cell to exchange information over air with the respective plurality of subscriber stations. Each cell has approximately a same radius and spans a 360 degree azimuth angle around the base station. The two adjacent cells define at least one bore axis that passes through the center of each cell. The method comprises acts of dividing each cell into at least three sectors, and assigning at least three different channels in each cell to exchange information between the at least one base station and the respective plurality of subscriber stations, wherein adjacent sectors of the at least three sectors in each cell are assigned different channels. The method also comprises an act of arranging the at least two adjacent cells with respect to each other such that sectors of the at least two adjacent cells that are similarly oriented approximately along the at least one bore axis and in which radiation is transmitted by the at least two base stations in essentially a same direction approximately along the at least one bore axis use different channels.

Another embodiment of the invention is directed to a wireless communication method, comprising acts of dividing a coverage area into a plurality of cells, dividing each cell of the plurality of cells into 6N sectors, N being an integer, and assigning a same set of C different channels to transport information in each cell of the plurality of cells, C being an integer. The method also comprises an act of arranging the plurality of cells using K different cell configurations, K being an integer not less than three, C being equal to at least K, the K different cell configurations including K different azimuth orientations of the cells with respect to one another.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF THE INVENTION

The present invention is directed to wireless communication methods and systems using multiple sectored cells. One aspect of the invention combines characteristics of sectored coverage areas, such as the potential for significantly increased capacity from frequency spectrum reuse, with characteristics of particular cell arrangements in cellular coverage areas that reduce interference between cells. In this manner, the invention provides a high capacity sectored multi-cell wireless communication system that may be deployed over an expansive coverage area without significant interference amongst neighboring cells.

Figure 1B:
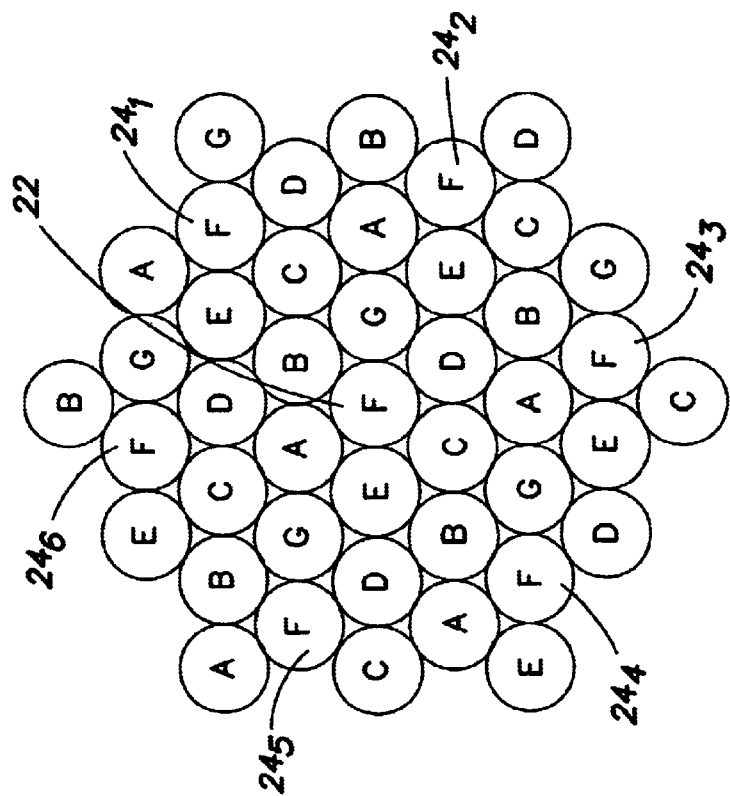
FIGS. 1A and 1B are diagrams showing two examples of frequency spectrum reuse in a cellular coverage area of a wireless communication system.
Figure 1A:
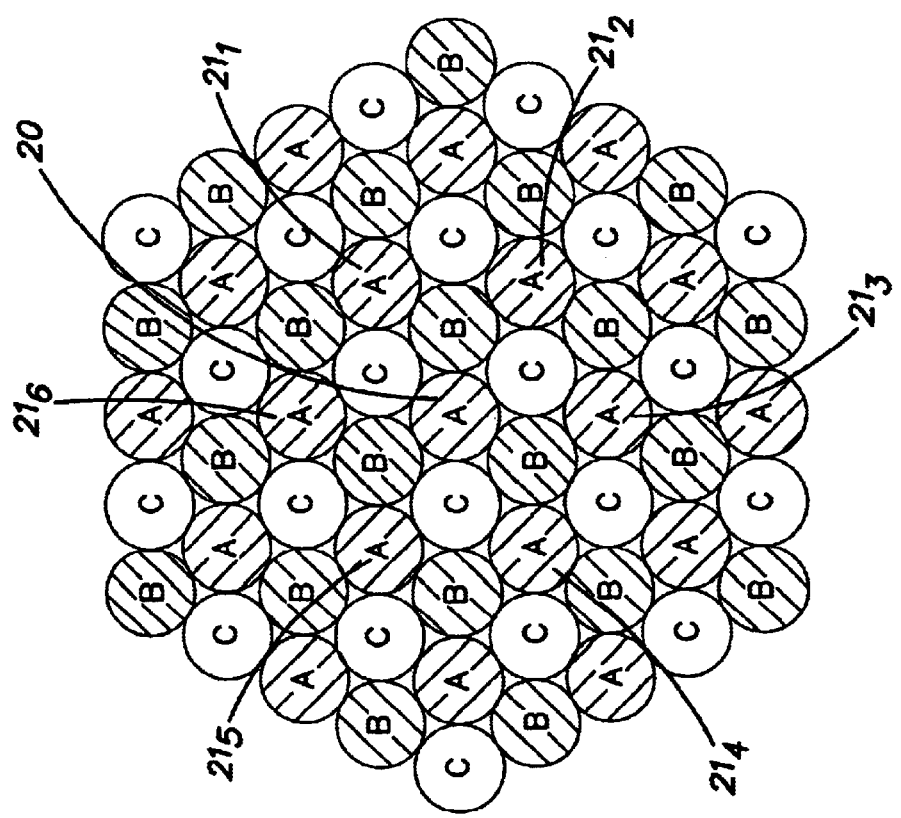
Figure 1C:
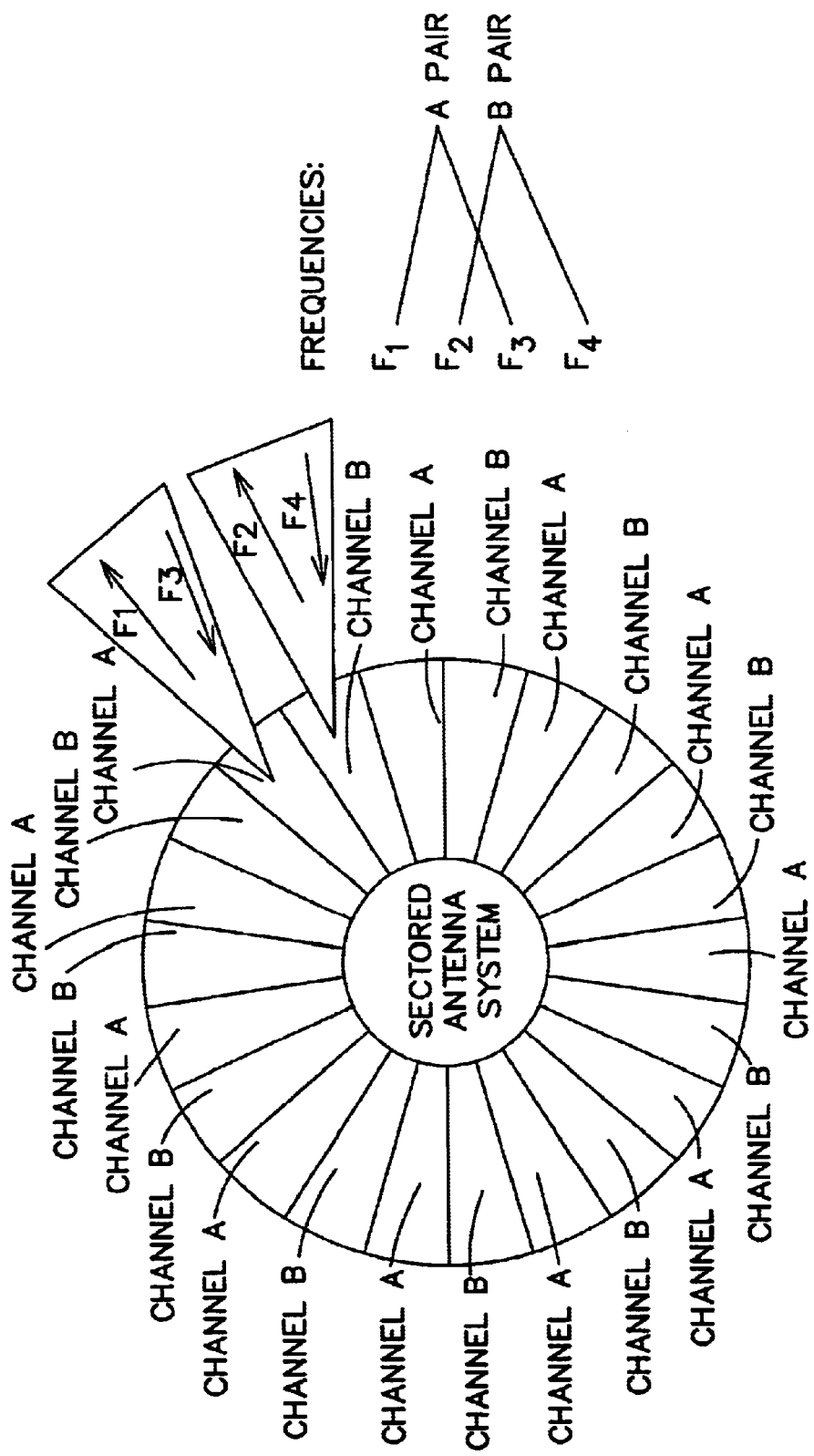
FIG. 1C is a diagram showing an example of frequency spectrum reuse in a sectored coverage area of a wireless communication system.

In one embodiment of the invention, each cell of a cellular coverage area, similar to those shown in FIGS. 1A and 1B, is divided into a number of sectors. A number of different channels are used in each cell to communicate between a base station and a number of subscriber stations located in the cell. The different channels in each cell may be half duplex channels (e.g., transmission of information from the base station to one or more subscriber stations in the cell) or full duplex channels (e.g., two way information exchange between the base station and one or more subscriber stations in the cell). In one aspect of this embodiment, at least some of the channels are reused in other cells of the coverage area. In yet another aspect, some channels may be reused both amongst sectors of a given cell and in other cells of the coverage area.

In embodiments of the invention involving channel reuse, wireless communication methods and systems of the invention generally are directed to implementing particular arrangements of the sectored cells of the coverage area with respect to one another such that interference amongst similarly oriented sectors of different cells using one or more same channels is reduced.

For example, in one embodiment of the invention, each cell of a cellular coverage area is divided into 24 sectors. In each cell, eight different full duplex channels are each used three times, and the channels are assigned to the sectors such that no two adjacent sectors use the same full duplex channel. Additionally, each cell of the coverage area uses the same eight different full duplex channels. At least seven different cell configurations are realized by rotating seven such cells by consecutive 15 degree increments about their centers. Each of the seven cell rotations results in a unique cell configuration, A–G. A number of such 24 sectored cells is arranged in a manner similar to that shown in FIG. 1B, with the designations A–G corresponding to a particular cell configuration (i.e., rotation). The cells may be deployed in extended formations, and can be extended as far as desired.

Following below are more detailed descriptions of various concepts related to, and embodiments of, wireless communication methods and systems according to the present invention using multiple sectored cells. It should be appreciated that various aspects of the invention as discussed above and outlined further below may be implemented in any of numerous ways, as the invention is not limited to any particular manner of implementation. Examples of specific implementations are provided for illustrative purposes only.

Figure 2:
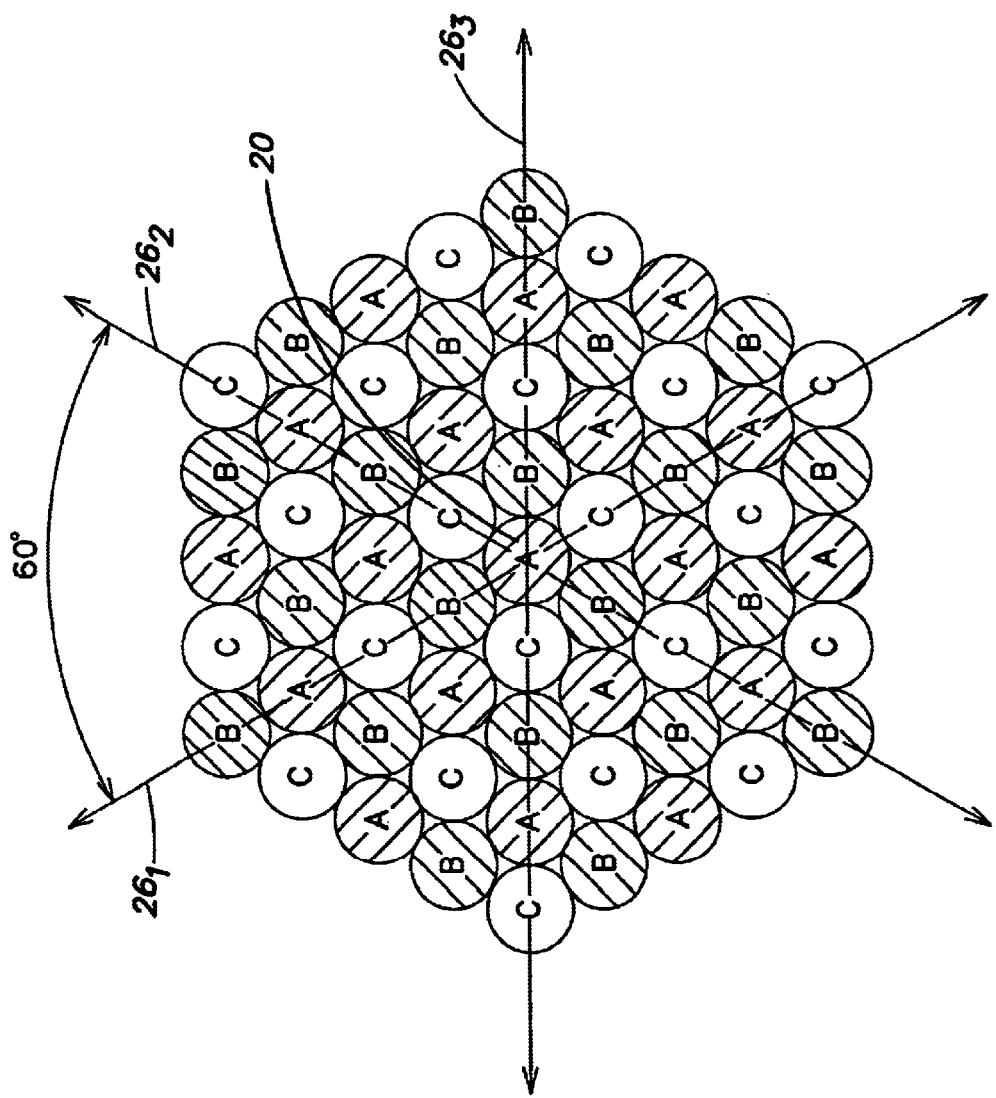
FIG. 2 is a diagram highlighting particular geometric characteristics of the cell arrangements illustrated in FIGS. 1A and 1B.

FIG. 2 shows an arrangement of cells in a honeycomb pattern similar to the arrangement shown in FIGS. 1A and 1B. Using the center cell 20 as a reference cell, Applicants have appreciated that for such arrangements of cells in which each cell has approximately a same radius, certain axes of symmetry result in the coverage area. In particular, by connecting a center point of the center cell 20 with respective center points of each cell adjacent to the center cell 20, three "bore" axes $26_1$, $26_2$, and $26_3$ are identified. If the center cell 20 is actually contiguous with each adjacent cell, as shown in FIG. 2, each bore axis also passes through respective tangent points between the center cell 20 and each adjacent cell. It should be appreciated, however, that the representation of cells in FIG. 2 is for purposes of illustration only, and that adjacent cells need not be physically contiguous with each other for purposes of the present invention; namely, adjacent cells merely may be proximate to each other. Additionally, it should be readily appreciated from FIG. 2 that a set of three bore axes similar to the bore axes $26_1$, $26_2$, and $26_3$ may be identified for each cell in the coverage area.

Applicants have recognized that the concept of bore axes in a honeycomb pattern cell arrangement such as shown in FIG. 2 is particularly relevant with respect to analyzing potential interference problems amongst cells in an arrangement of multiple sectored cells. In particular, it is noteworthy that, as a result of the honeycomb pattern of the cell arrangement, each bore axis of a given cell is oriented 60 degrees with respect to other bore axes of the cell.

Figure 3:
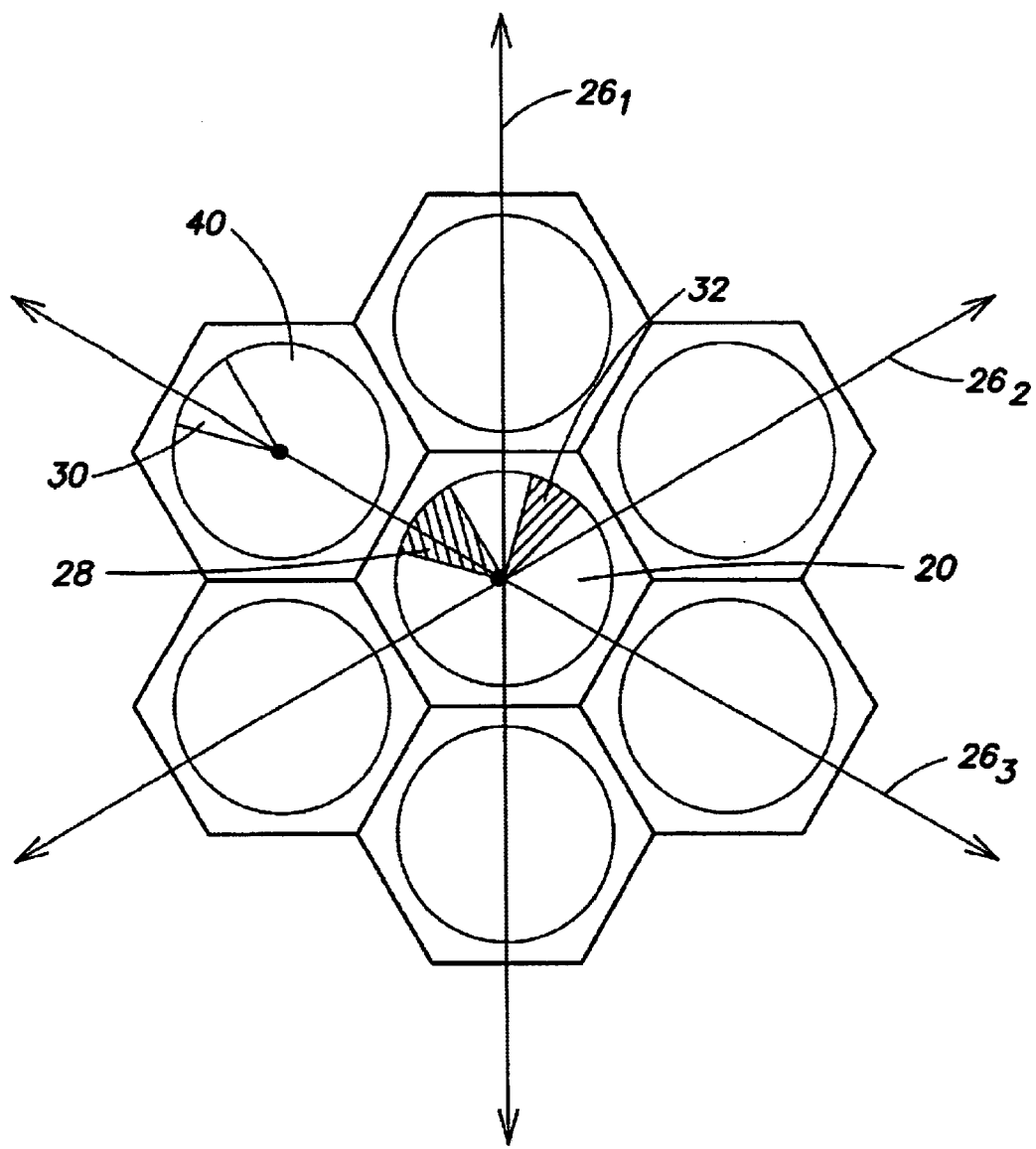
FIG. 3 is a diagram showing a more detailed view of a group of cells shown in FIG. 2, illustrating the concept of cell bore axes and orientation of sectors in a cell with respect to the bore axes, according to one embodiment of the invention.

FIG. 3 is a diagram similar to FIG. 2 showing only the seven most central cells illustrated in FIG. 2, including the center cell 20. In FIG. 3, two different sectors 28 and 32 are identified in the center cell 20, and a third sector 30 is identified in a cell 40 adjacent to the center cell 20. In FIG. 3, the sectors 28 and 30 are similarly oriented approximately along the bore axis $26_3$, while the sector 32 in the cell 20 is not oriented along any particular bore axis $26_1$, $26_2$, or $26_3$. For purposes of illustration in FIG. 3, each cell is circumscribed by a hexagon to emphasize the honeycomb pattern of the cell arrangement and the 60 degree relationships between the bore axes $26_1$, $26_2$, and $26_3$.

As discussed above in connection with FIGS. 1A and 1B, in each cell of FIG. 3 radiation generally is transmitted by a base station, located approximately at a center of the cell, outward to one or more users located in the cell. For example, radiation transmitted from approximately the center of the cell 20 outward in the sector 28 travels in a direction approximately along the bore axis $26_3$ to users located in the sector 28. As the radiation from the center cell 20 continues to travel outward from the cell, the radiation transmitted in the sector 28 ultimately may reach users located in the sector 30 of the adjacent cell 40.

In particular, sectors of any two adjacent cells in FIG. 3 that are similarly oriented approximately along a same bore axis, and in which radiation is transmitted in essentially a same direction approximately along the same bore axis, may be particularly susceptible to interference problems. In contrast, radiation that is transmitted in a sector that is not oriented approximately along a bore axis, as shown, for example, by the sector 32 in the center cell 20, may be less likely to interfere with radiation transmitted in an adjacent cell. Accordingly, Applicants have recognized that in arrangements of multiple adjacent sectored cells, those sectors that are similarly oriented approximately along the bore axes of each cell have particular significance in assessing potential interference problems amongst cells in a coverage area.

Figure 4:
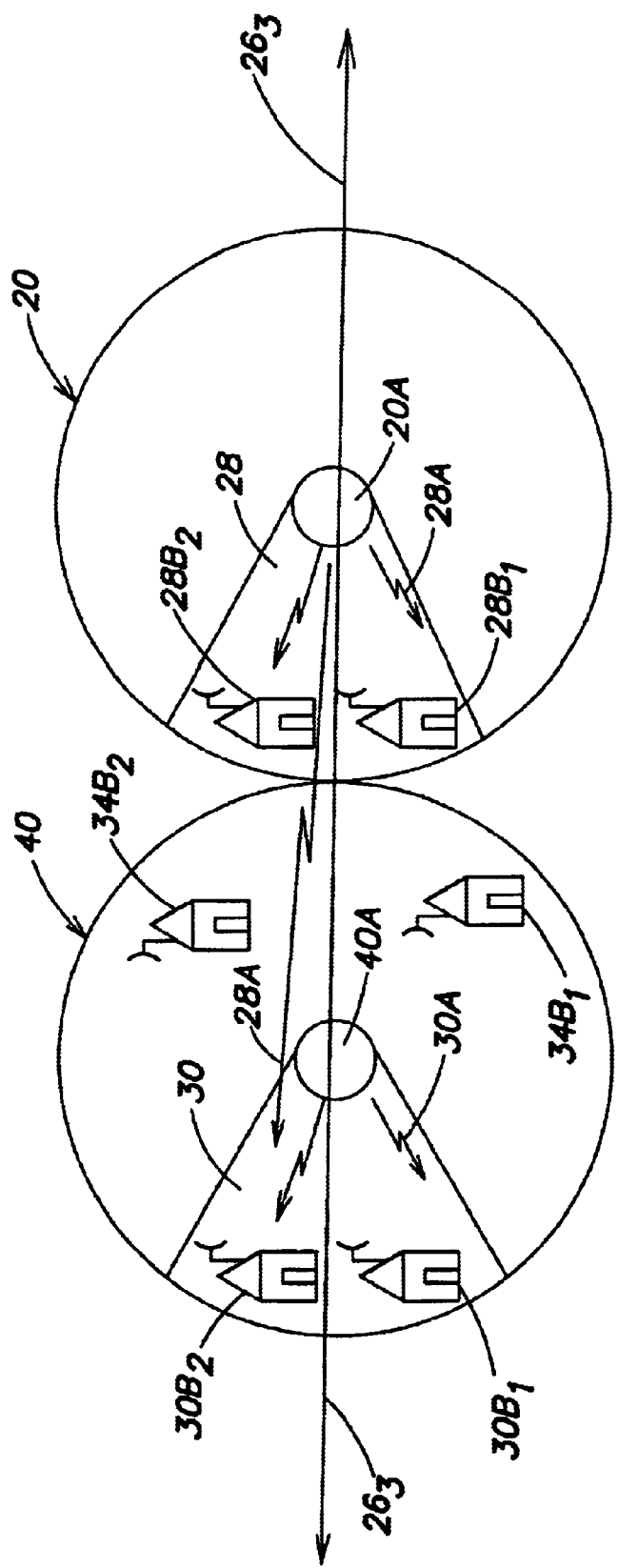
FIG. 4 is a diagram showing a more detailed view of two cells shown in FIG. 3.

FIG. 4 is a more detailed diagram of a portion of FIG. 3, showing the center cell 20 and the adjacent cell 40. In FIG. 4, as in FIG. 3, the bore axis $26_3$ passes through approximately the center of each cell 20 and 40, and the sector 28 of cell 20 as well as the sector 30 of cell 40 are oriented approximately along the bore axis $26_3$.

In FIG. 4, a first base station 20A, located approximately at the center of the cell 20, transmits radiation 28A to a plurality of subscriber stations, shown for example as buildings $28B_1$ and $28B_2$ located in the sector 28. Similarly, a second base station 40A, located approximately at the center of the cell 40, transmits radiation 30A to a different plurality of subscriber stations, shown for example as buildings $30B_1$ and $30B_2$ located in the sector 30. FIG. 4 also shows two other subscriber stations $34B_1$ and $34B_2$ in the cell 40 which are not located in the sector 30.

Each of the subscriber stations $28B_1$, $28B_2$, $30B_1$, $30B_2$, $34B_1$, and $34B_2$ shown in FIG. 4 typically includes a directional antenna that is oriented essentially in a direction toward the base station at the center of the cell. Typically, the directional antenna of the subscriber stations transmits and receives radiation within a relatively narrow azimuth angular range (e.g., approximately 10–15 degrees). Accordingly, it should be readily appreciated from FIG. 4 that the radiation 28A transmitted by the base station 20A in the cell 20 is not likely to pose potential interference problems for subscriber stations $34B_1$ and $34B_2$ in the cell 40, because the directional antennas of these subscriber stations are not oriented to receive radiation traveling in the direction of the radiation 28A (i.e., approximately along the bore axis $26_3$).

However, it should also be appreciated from FIG. 4 that depending on, for example, the strength of the radiation 28A, this radiation possibly may be received by the subscriber stations $30B_1$ and $30B_2$ located in the sector 30 of the cell 40. If the radiation 28A is in a frequency band similar to that used for the radiation 30A transmitted in the sector 30 by the base station 40A, the radiation 28A may serve as a source of interference in the sector 30. Accordingly, as discussed above in connection with FIG. 3, FIG. 4 more clearly demonstrates that in implementing a particular arrangement of sectored cells in a wireless communication system using multiple sectored cells, potential interference between sectors of adjacent cells which are oriented approximately along a same bore axis poses a significant system design consideration.

In both FIGS. 3 and 4, the sectors 28 and 30 are oriented such that the bore axis $26_3$ passes through each of the sectors 28 and 30. However, it should be appreciated that one or more sectored cells of a cell arrangement may be divided and oriented such that sector boundaries in a given cell may or may not coincide with a bore axis of the cell. For example, cells similar to the cells 20 and 40 of FIGS. 3 and 4 alternatively may be divided and oriented such that one of the boundaries of one or both of the sectors 28 and 30 coincides with the bore axis $26_3$. In this case, any sectors having a "bore axis boundary" nonetheless may be considered to be oriented approximately along the bore axis serving as the boundary, as it is possible that some radiation that is transmitted in the sector close to the bore axis boundary may constitute a source of interference for a similarly oriented sector in an adjacent cell. Accordingly, for purposes of the present disclosure, the phrase "oriented approximately along a bore axis" is used to describe sectors that either have one or more bore axes boundaries, or sectors through which one or more bore axes pass.

Figure 5:
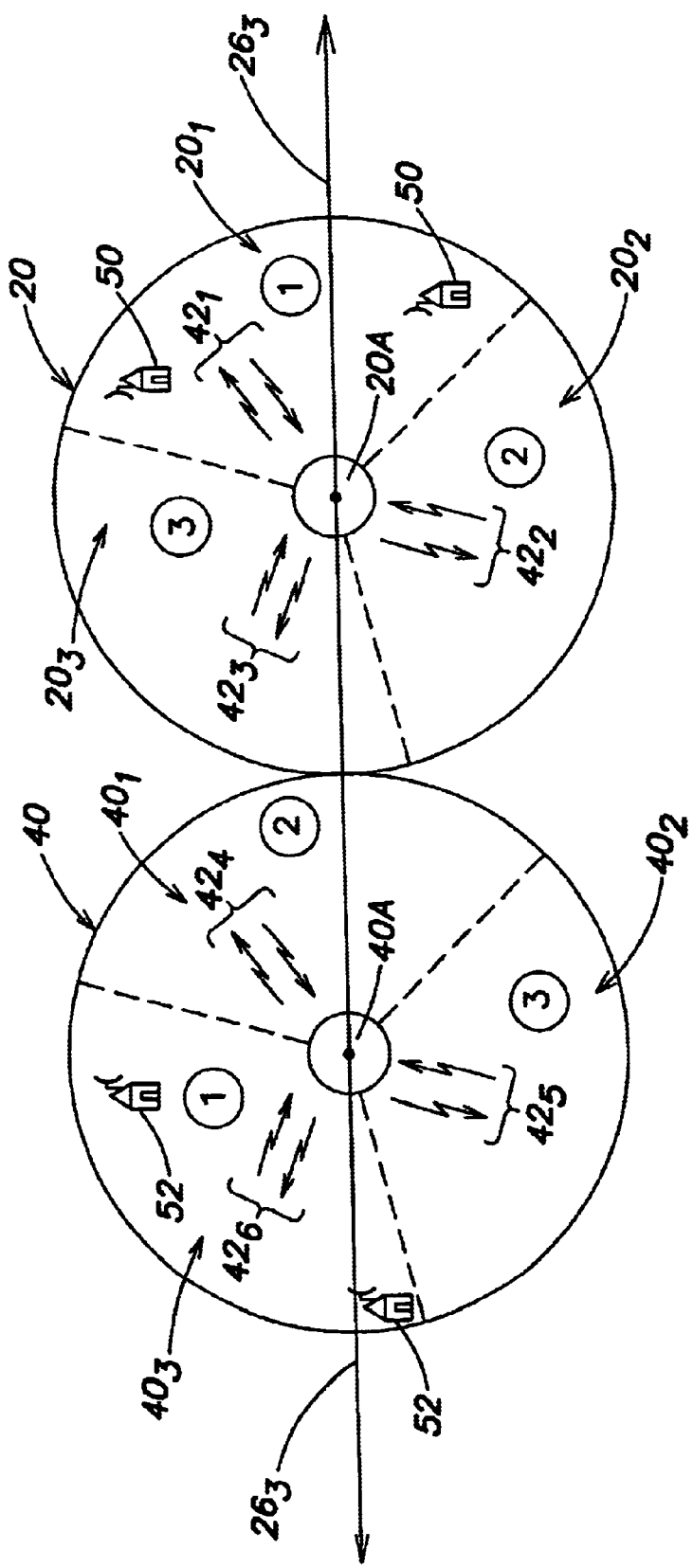
FIG. 5 is a diagram showing a wireless communication system according to one embodiment of the invention, based on the two cells shown in FIG. 4.

FIG. 5 is a diagram showing a wireless communication system using adjacent sectored cells according to one embodiment of the invention. Although FIG. 5 shows two cells 20 and 40 having an essentially circular shape and being contiguous with one another (i.e., sharing a point of tangency), it should be appreciated that such a depiction of cells in FIG. 5 is for purposes of illustration only. In particular, as discussed above in connection with FIG. 2, the cells 20 and 40 need not have an exactly circular shape and need not be tangential. Rather, it is to be understood that the cells 20 and 40 are adjacent and sufficiently near each other so as to be immediate neighbors in an arrangement of a plurality of such cells, as shown for example in FIG. 3. Additionally, for purposes of the present discussion, each cell in FIG. 5 is assumed to have approximately the same radius and to span a 360 degree azimuth angle around the center of the cell. As discussed above in connection with FIG. 4, the two adjacent cells 20 and 40 in FIG. 5 define a bore axis $26_3$ that passes through the center of each cell.

According to one embodiment of the invention, each of the sectored cells 20 and 40 shown in FIG. 5 may comprise a wireless communication "subsystem" that can serve as a stand-alone wireless communication system, as described for example in U.S. application Ser. No. 09/287,144, entitled "POINT-TO-MULTIPOINT TWO-WAY BROADBAND WIRELESS COMMUNICATION SYSTEM," hereby incorporated herein by reference. In particular, each of the cells shown in FIG. 5 may include a respective plurality of subscriber stations and at least one base station disposed approximately at a center of the cell to exchange information over air with the subscriber stations of the cell. For example, as shown in FIG. 5, the cell 20 includes a base station 20A and a plurality of subscriber stations 50, while the cell 40 includes a base station 40A and a plurality of subscriber stations 52.

Although two subscriber stations are shown in each cell of FIG. 5, it should be appreciated that any number of subscriber stations may be dispersed in a variety of manners throughout each of the cells 20 and 40. Additionally, it should also be appreciated that while FIG. 5 shows subscriber stations 50 and 52 as buildings having fixed locations, the invention is not necessarily limited in this respect; namely, wireless communication systems according to various embodiments of the invention may be suitable for both mobile and/or fixed subscriber stations dispersed amongst the cells of the coverage area.

In the wireless communication system shown in FIG. 5, each cell is divided into at least three sectors. In particular, the cell 20 is divided into a first sector $20_1$, a second sector $20_2$, and a third sector $20_3$. Similarly, the cell 40 is divided into a first sector $40_1$, a second sector $40_2$, and a third sector $40_3$. The base stations 20A and 40A in each cell exchange information with the respective plurality of subscriber stations 50 and 52 using at least three different channels, shown as $42_1$, $42_2$, and $42_3$ in cell 20 and $42_4$, $42_5$, and $42_6$ in cell 40. The channels are assigned amongst the sectors of each cell such that the base stations use different channels in adjacent sectors in each cell.

While FIG. 5 shows the different channels $42_1$, $42_2$, and $42_3$ as full duplex channels to accommodate two-way information exchange between the base station and one or more subscriber stations in the cell, alternatively the different channels in each cell may be half duplex channels (e.g., transmission of information from the base station to one or more subscriber stations in the cell). For purposes of consistency in some of the subsequent drawings, the different channels in each cell are shown as full duplex channels. However, it should be appreciated in each of the illustrated embodiments discussed below that the different channels may include half duplex channels according to other embodiments of the invention.

Figure 5A:
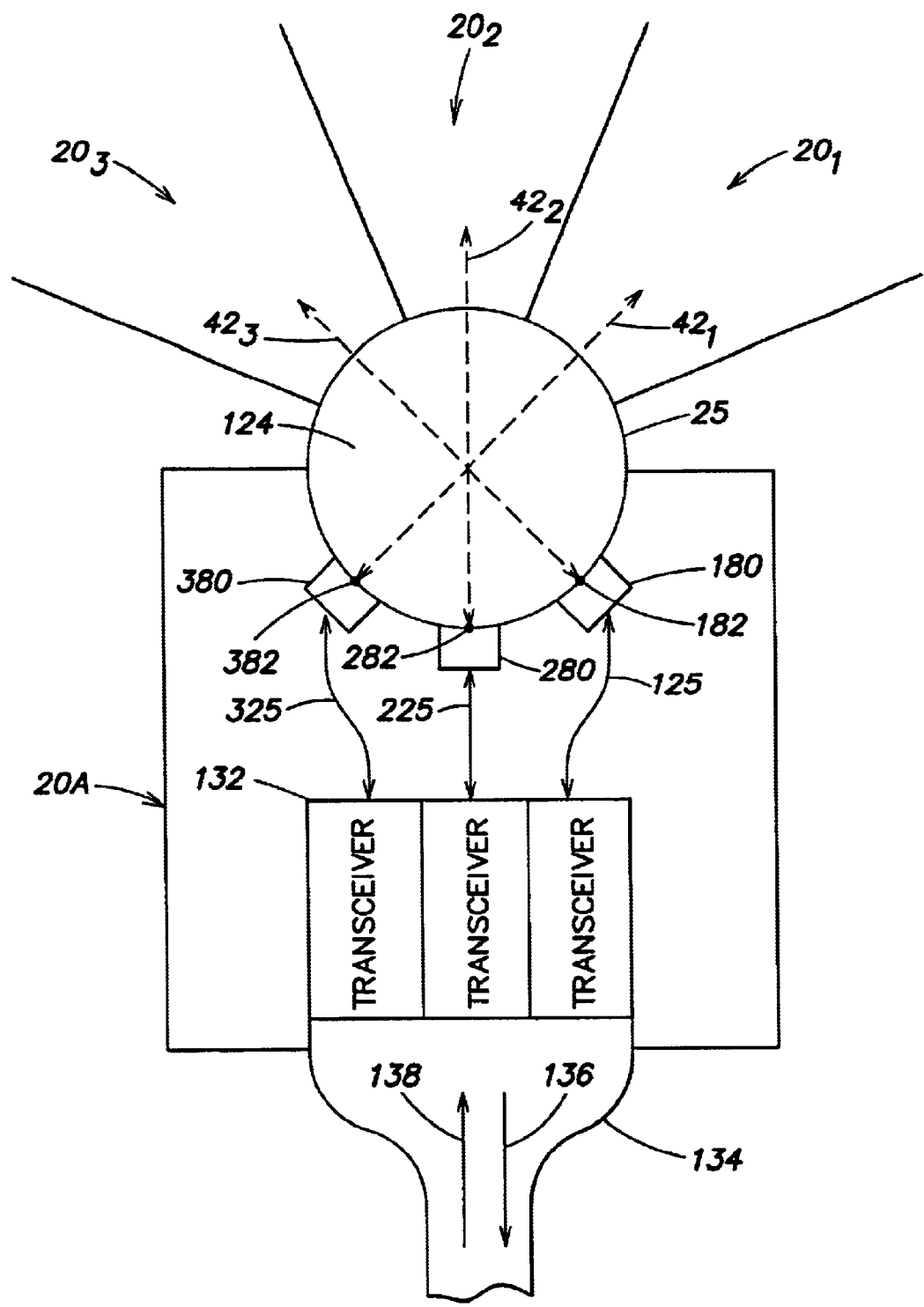
FIG. 5A is a diagram showing a more detailed example of one base station of the wireless communication system of FIG. 5, according to one embodiment of the invention.

FIG. 5A is a more detailed diagram showing one example of the base station 20A suitable for purposes of the present invention. The base station 20A illustrated in FIG. 5A similarly may be employed as the base station 40A of FIG. 5. To exchange unique information in each sector of a cell in the system of FIG. 5, the base stations 20A and 40A each may include a lens-based sectored antenna system, as described for example in U.S. application Ser. Nos. 08/677,413, 08/963,039, and 09/151,036, each of which applications are hereby incorporated herein by reference. In particular, FIG. 5A shows that the base station 20A may include the lens-based sectored antenna system 25 to transmit and receive the full duplex channels $42_1$, $42_2$, and $42_3$ (shown symbolically as dashed lines) for exchanging information in the sectors $20_1$, $20_2$, and $20_3$, respectively. For ease of illustration, the sectors $20_1$, $20_2$, and $20_3$ are shown in FIG. 5A as covering less than a full 360 degree azimuth angle around the base station 20A. However, it should be appreciated that, as shown in FIG. 5, the sectors $20_1$, $20_2$, and $20_3$ may cover up to a full 360 degree azimuth angle around the base station.

As shown in FIG. 5A, the sectored antenna system 25 includes a lens 124 having one or more focal points, wherein each focal point corresponds to one sector. In FIG. 5A, three focal points 182, 282, and 382 are shown for the lens 124, corresponding to sectors $42_3$, $42_2$, and $42_1$, respectively. One example of the lens 124 suitable for purposes of the invention includes, but is not limited to, a Luneberg-type lens, which may be formed by multiple layers of dielectric materials having different dielectric constants. Luneberg-type lenses were first proposed in the 1940's and are discussed, for example, in the textbook "Mathematical Theory of Optics," R. K. Luneberg, University of California Press, Berkeley and Los Angeles, 1964, Library of Congress Catalog No. 64-19010, pages 187–188, hereby incorporated herein by reference.

A Luneberg lens generally is in the form of a sphere of material having an index of refraction (or dielectric constant) that varies as a function of radius from a center of the sphere to an outer surface of the sphere, according to a particular mathematical relationship. Luneberg lenses possess a unique focusing property; namely, plane waves of radiation incident upon the lens from a distant radiation source are imaged, or focused, at a particular focal point on the outer surface of the lens. The focal point to which the incident radiation is focused is at an end of a diameter of the lens which is parallel to the propagation direction of the incoming wave. Conversely, a radiation source located at a focal point on the outer surface of the lens and emitting radiation through the lens ultimately produces a plane wave of radiation propagating in the direction parallel to a diameter of the lens that includes the focal point. Accordingly, as shown in FIG. 5A, the radiated information carriers for the full duplex channels $42_1$, $42_2$, and $42_3$, respectively would be focussed to the focal points 382, 282, and 182 by a Luneberg-type lens serving as the lens 124.

The sectored antenna system 25 of FIG. 5A additionally includes one or more feed devices, located proximate to each focal point of the lens 124, to transmit and/or receive the information carriers for the full duplex channel (or channels) in each sector. For example, in FIG. 5A, feed device 180 located at focal point 182 transmits and receives the information carriers for the full duplex channel $42_3$ in sector $20_3$. Similarly, feed device 280 located at focal point 282 transmits and receives the information carriers for the full duplex channel $42_2$ in sector $20_2$, and feed device 380 located at focal point 382 transmits and receives the information carriers for the full duplex channel $42_1$ in sector $20_1$. While FIG. 5A shows only one feed device to both transmit and receive information carriers in each sector, one or more feed devices may be dedicated to transmitting information carriers in each sector, while one or more other feed devices may be dedicated to receiving information carriers in each sector.

FIG. 5A also illustrates that the base station 20A may include one or more tunable transceivers 132 coupled between the feed devices of the antenna system 25 and a communication link 134. Each transceiver 132 converts information carriers received by the antenna system 25, in one of the sectors $20_1$, $20_2$, and $20_3$, to one or more corresponding information carriers 136 of the communication link 134. Similarly, each transceiver 132 converts one or more information carriers 138 from the communication link 134 to corresponding information carriers for transmission by the antenna system 25 in one of the sectors $20_1$, $20_2$, and $20_3$. As shown in FIG. 5A, the base station 20A includes one transceiver 132 for each sector, although according to other embodiments the base station may include more than one transceiver 132 per sector.

In FIG. 5A, the sectored antenna system 25 may be located within close proximity of the transceivers 132 so as to minimize any possible signal attenuation. In particular, each transceiver 132 may be coupled to one or more respective feed devices of the antenna system 25 using a low-loss connector. For example, in FIG. 5A the transceivers 132 are shown connected to feed devices 180, 280, and 380 using low-loss cables 125, 225 and 325, respectively, which may be coaxial cables having a short length. Other low-loss methods of connecting the transceivers 132 to the antenna system 25, such as one or more fiber optic cables, may be employed to facilitate a greater separation between the antenna system 25 and transceivers 132.

With reference again to FIG. 5, the full duplex channels $42_1$–$42_6$ in the two cells 20 and 40 may be uniquely distinguishable by virtue of different carrier frequencies of the information carriers for the channels and/or different polarizations of the information carriers for the channels. Additionally, each full duplex channel $42_1$–$42_6$ may represent a different time slot in a series of TDMA channels, or may have a unique code amongst a group of coded channels (e.g., a unique PN code amongst a group of CDMA channels). Moreover, various combinations and permutations of the foregoing potentially distinguishing attributes of the full duplex channels are possible. Accordingly, for purposes of clarity in the discussions below, the different full duplex channels are distinguished primarily in terms of different carrier frequencies, although as pointed out immediately above, the different full duplex channels may be distinguished in a number of ways according to various embodiments of the invention.

Additionally, each full duplex channel $42_1$–$42_6$ shown in FIG. 5 may include a full duplex channel set. For example, the full duplex channel $42_1$ may represent a set of TDMA channels (i.e., time slots) on a particular carrier frequency, or may represent a set of closely spaced FDMA or CDMA (i.e., frequency or coded) channels within a particular frequency band, as well as a set of OFDM channels using, for example, VOFDM, COFDM, or SC-OFDM coding/decoding techniques. The channel set $42_1$ may be distinguished from the channel set $42_2$, for example, by employing different carrier frequencies for TDMA channel sets or different frequency bands for FDMA, CDMA, or OFDM channel sets. Additionally, different full duplex channels sets may be uniquely identified from other full duplex channel sets by different polarizations of the information carriers for the channel sets, or by combinations of different polarizations and different frequency bands.

In FIG. 5 and the subsequent drawings, a simplified notation to indicate the "uniqueness" or type of a given channel (or a given channel set) is used; namely, a particular channel type (i.e., distinguished by frequency, polarization, time slot, code, etc.) is indicated with a specific number (e.g., an encircled number) in each sector of each cell. For example, in the cell 20 of FIG. 5, the encircled number "1" in the sector $20_1$ indicates a particular channel type for the full duplex channel $42_1$. Similarly, the encircled number "2" in sector $20_2$ indicates a different channel type for the full duplex channel $42_2$, and the encircled number "3" in sector $20_3$ indicates yet another different channel type for the full duplex channel $42_3$.

In the system of FIG. 5, according to one embodiment of the invention, the same three different channel types 1, 2, and 3 are used in each of the cells 20 and 40 as one example of a possible frequency spectrum reuse scheme according to the invention. In particular, the full duplex channel $42_6$ in sector $40_3$ of cell 40 is also indicated as type 1, the full duplex channel $42_4$ in sector $40_1$ is also indicated as type 2, and the full duplex channel $42_5$ in sector $40_2$ is also indicated as type 3. While the example of FIG. 5 illustrates that the same set of three different full duplex channels may be used in the adjacent cells 20 and 40, it should be appreciated that the invention is not limited in this respect. Namely, in the system of FIG. 5, a total of six different full duplex channels (i.e., three different full duplex channel types in each cell) may be used amongst the two cells. It should also be appreciated however, as discussed above, that reusing the full duplex channels amongst the different cells conserves valuable resources in the wireless communication system by increasing the utilization of available frequency spectrum.

In FIG. 5, the two adjacent cells 20 and 40 are arranged with respect to each other such that sectors of the adjacent cells that are similarly oriented approximately along the bore axis $26_3$, and in which radiation is transmitted by the base stations in essentially the same direction approximately along the bore axis $26_3$, use different full duplex channels. In particular, sector $40_1$ of cell 40 and sector $20_1$ of cell 20, both oriented approximately along the bore axis $26_3$, use different full duplex channels $42_4$ and $42_1$, respectively, as indicated by the encircled number 2 in sector $40_1$ and the encircled number 1 in sector $20_1$. Similarly, the sectors $40_3$ of cell 40 and $20_3$ of cell 20, also both oriented approximately along the bore axis $26_3$ (but in which radiation is transmitted in a direction opposite to that of sectors $20_1$ and $40_1$) use different full duplex channels $42_6$ and $42_3$, respectively, as indicated by the encircled number 1 in sector $40_3$ and the encircled number 3 in sector $20_3$.

In the wireless communication system shown in FIG. 5, it should be appreciated that the boundaries between adjacent sectors in each cell may or may not coincide with the bore axis $26_3$, as discussed above in connection with FIGS. 3 and 4, and that the particular arrangement shown in FIG. 5 is for purposes of illustration only. In general, a number of relative arrangements and orientations of the cells with respect to one another are suitable for purposes of the invention. However, as discussed further below in connection with FIG. 8, particular choices of sector boundaries with respect to bore axes of the cells facilitate an analysis of potential interference problems amongst the cells.

Figure 6:
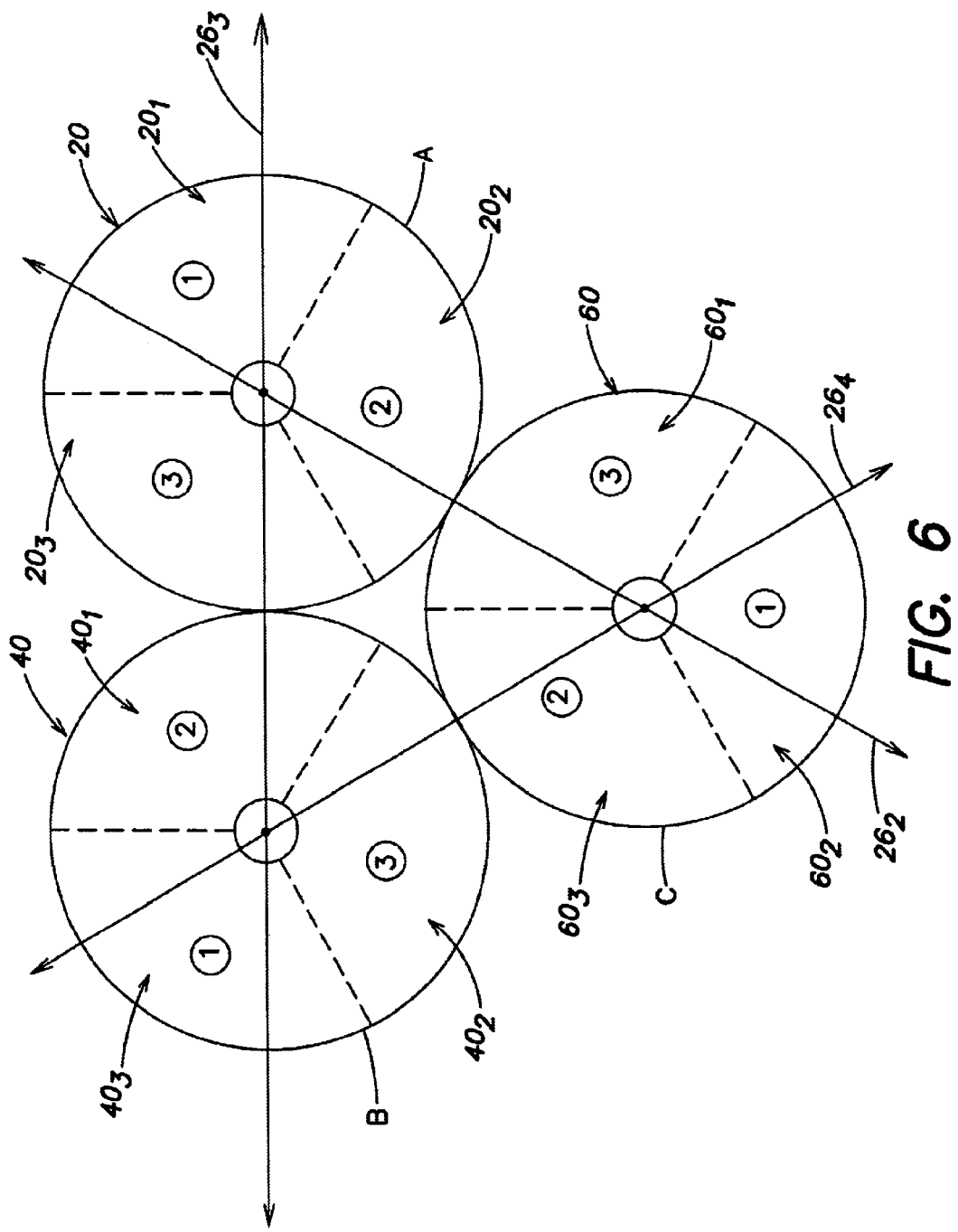
FIG. 6 is a diagram showing a cell arrangement for a coverage area of a wireless communication system based on three cells, according to one embodiment of the invention.

FIG. 6 is a diagram similar to FIG. 5 showing another embodiment of a wireless communication system according to the invention. In particular, FIG. 6 shows a third cell 60 that is mutually adjacent with the cells 20 and 40. While not explicitly shown or labeled in FIG. 6, the cell 60 includes at least one base station and a plurality of subscriber stations, in a manner similar to that of the cells 20 and 40 as shown in FIG. 5. The three cells 20, 40, and 60 of FIG. 6 define three bore axes $26_2$, $26_3$, and $26_4$, wherein each bore axis passes through the centers of two of the three cells.

Like the system of FIG. 5, each of the cells in FIG. 6 is divided into three sectors. Each cell uses three different channels, as indicated by encircled numbers in each sector, to communicate with the subscriber stations in the cell. While FIG. 6 shows that the same three different channels are reused amongst the three cells, it should be appreciated that the invention is not limited in this respect, and that the three cells may utilize more than three different channels arranged in a variety of manners amongst the cells, as discussed above.

In FIG. 6, the cells 20, 40, and 60 are arranged with respect to each other such that sectors of adjacent cells that are similarly oriented approximately along one bore axis of the three bore axes $26_2$, $26_3$, and $26_4$, and in which radiation is transmitted in essentially a same direction approximately along the one bore axis, use different channels. Accordingly, using the simplified notation for channel types discussed above in connection with FIG. 5, sectors $40_1$ and $20_1$, in which radiation is transmitted in essentially a same direction approximately along the bore axis $23_3$, use different channel types 2 and 1, respectively. Likewise, sector $40_2$ and sector $60_2$, in which radiation is transmitted in essentially the same direction approximately along the bore axis $26_4$, use different channel types 3 and 1, respectively. Similarly, sectors $20_3$ and $40_3$, in which radiation is transmitted in essentially the same direction approximately along the bore axis $26_3$, use different channel types 3 and 1, respectively. It should be readily appreciated from FIG. 6 that a similar analysis may be performed on any pair of sectors in which radiation is transmitted in essentially the same direction approximately along any of the bore axes $26_2$, $26_3$, and $26_4$.

In the wireless communication system shown in FIG. 6, it is noteworthy that by using at least three different channels in each cell, the same three different channels may be reused in all other cells of the system by employing a pattern of three different cell configurations, wherein each cell configuration is uniquely identified by a particular azimuth orientation of the cell about the center of the cell. In FIG. 6, the cell 20 is labeled as configuration A, the cell 40 is labeled as configuration B, and the cell 60 is labeled as configuration C. As discussed above, while each cell configuration A, B, and C uses the same set of different channels 1, 2, and 3, each of the configurations A, B, and C represents a different azimuth orientation of the cells with respect to each other.

For example, in FIG. 6, the configuration B (represented by the cell 40) is obtained by rotating the configuration C (represented by the cell 60) by 120 degrees in a clockwise direction. Similarly, the configuration A (represented by the cell 20) is obtained by rotating the configuration B (represented by the cell 40) by 120 degrees in a clockwise direction, or by rotating the configuration C by 120 degrees in a counterclockwise direction. In particular, it should be appreciated that the concept behind this manner of uniquely configuring cells is that by employing the same N different full duplex channels in each cell, at least N different azimuth orientations of the cells with respect to one other are possible, so as to arrive at N possible different cell configurations (N being an integer).

It should also be appreciated that while the wireless communication system shown in FIG. 6 illustrates different cell configurations based on reusing the same set of different channels in each cell and orienting the cells so as to have a particular azimuth orientation with respect to one another, different cell configurations similarly may be achieved by using different channel types for the channels from cell to cell. For example, rather than reusing channel types 1, 2, and 3 in each of the cells 20, 40, and 60, alternatively channel types 1, 2, and 3 can be used in cell 20, different channel types 4, 5, and 6 may be used in cell 40, and yet other different channel types 7, 8, and 9 may be used in cell 60. As discussed above, each of the different channel types may represent a unique carrier frequency, polarization, time slot, or channel code, for example, and the different channel types may be arranged amongst the three cells in a variety of manners. Furthermore, a combination of different channel types and different relative azimuth orientations may be used amongst the cells 20, 40, and 60 to realize three or more different cell configurations.

From the foregoing, it should be appreciated that a rich variety of possibilities according to the present invention exists for deriving three different sectored cell configurations by dividing each cell into at least three sectors and by employing at least three different half or full duplex channels in each cell. Additionally, as discussed above, it should be appreciated that each channel may include a half or full duplex channel set that is uniquely identified, for example, by one or both of frequency band and polarization.

Figure 7:
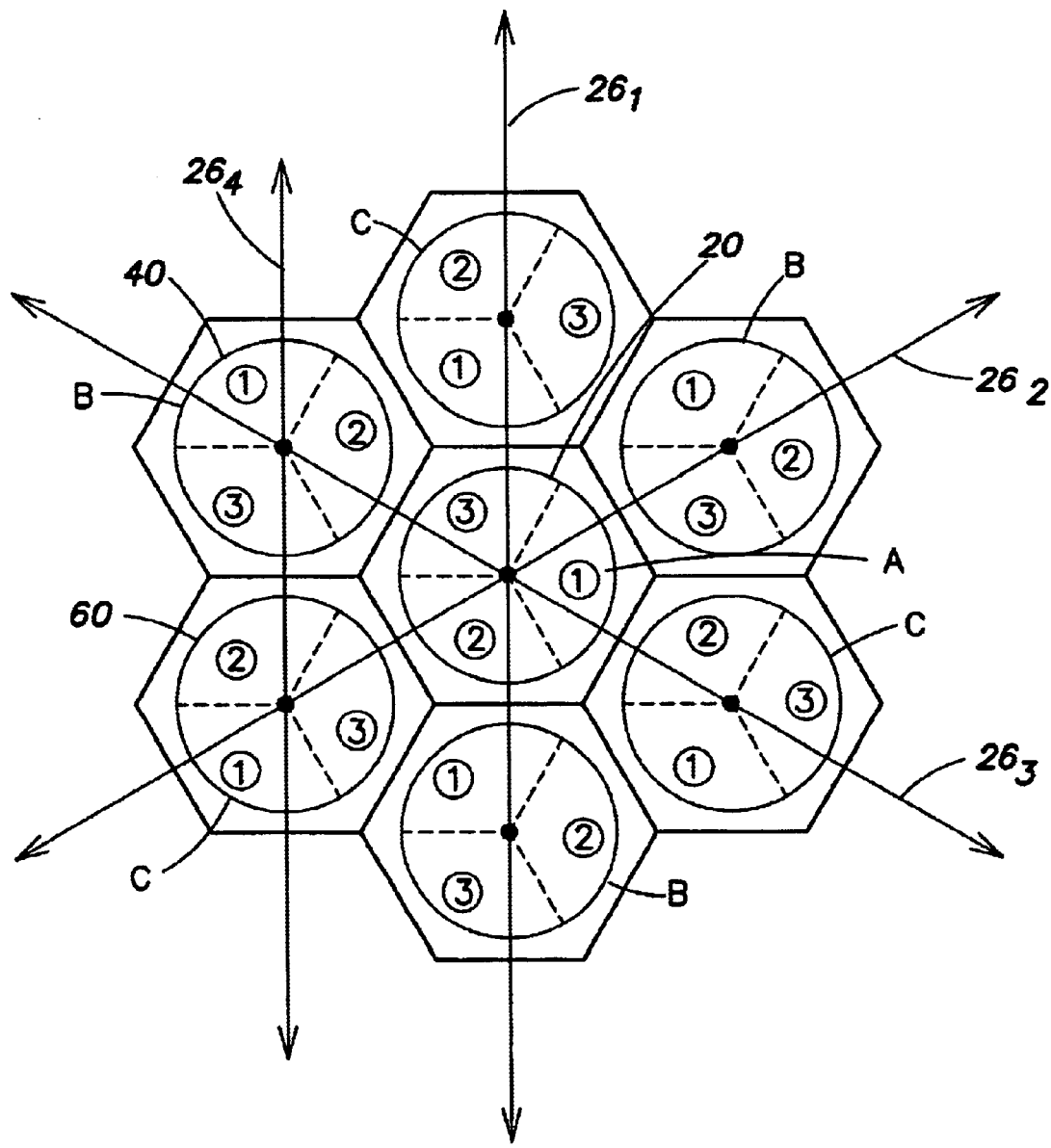
FIG. 7 is a diagram showing a cell arrangement for a coverage area of a wireless communication system based on seven cells and three different cell configurations, according to one embodiment of the invention.

FIG. 7 is a diagram similar to that of FIG. 3 showing seven cells, including the center cell 20 and the cells 40 and 60 of FIG. 6. FIG. 7 shows the bore axes $26_1$, $26_2$, and $26_3$ which each pass through the center cell 20, as well as the bore axis $26_4$ which, as shown in FIG. 6, passes through the centers of the cells 40 and 60. Using the three different cell configurations A, B, and C shown in FIG. 6, the seven cells of FIG. 7 are arranged in a manner similar to that shown in FIG. 2; namely, the center cell 20 uses cell configuration A, while each of the six other cells surrounding the center cell 20 use configurations B and C in an alternating manner. As a result, the seven cells are arranged with respect to one another such that sectors of adjacent cells that are similarly oriented approximately along one of the bore axes in each cell, and in which radiation is transmitted in the sectors in essentially a same direction approximately along the one of the bore axes, use different channels.

While the wireless communication system of FIG. 7 uses three different cell configurations A, B, and C derived from different azimuth orientations of the cells with respect to one another, it should be appreciated that the seven cells of FIG. 7 may employ three different cell configurations that are derived using one or both of different azimuth orientations of the cell and different channel types for the at least three different channels used in each cell, as discussed above in connection with FIG. 6. Additionally, it should be appreciated from FIG. 2 that the pattern of cells illustrated in FIG. 7 using three different cell configurations A, B, and C may be repeated a number of times in a coverage area to create an expansive honeycomb pattern cell arrangement of a number of sectored cells.

At this point, it is convenient to introduce additional notation for describing a particular "cell layout" of a coverage area, including variables to indicate a number of different cell configurations used in the coverage area, a number of sectors used in each cell, and a number of different channels used in each cell. Accordingly, the notation $$K \times S \times C$$

is defined, where:
  K designates the number of different cell configurations used in a coverage area;
  S designates the number of sectors in each cell; and
  C designates the number of different channels used in each cell.

Using the above notation, the wireless communication system shown in FIG. 7 may be described as employing a 3×3×3 cell layout.

Figure 8:
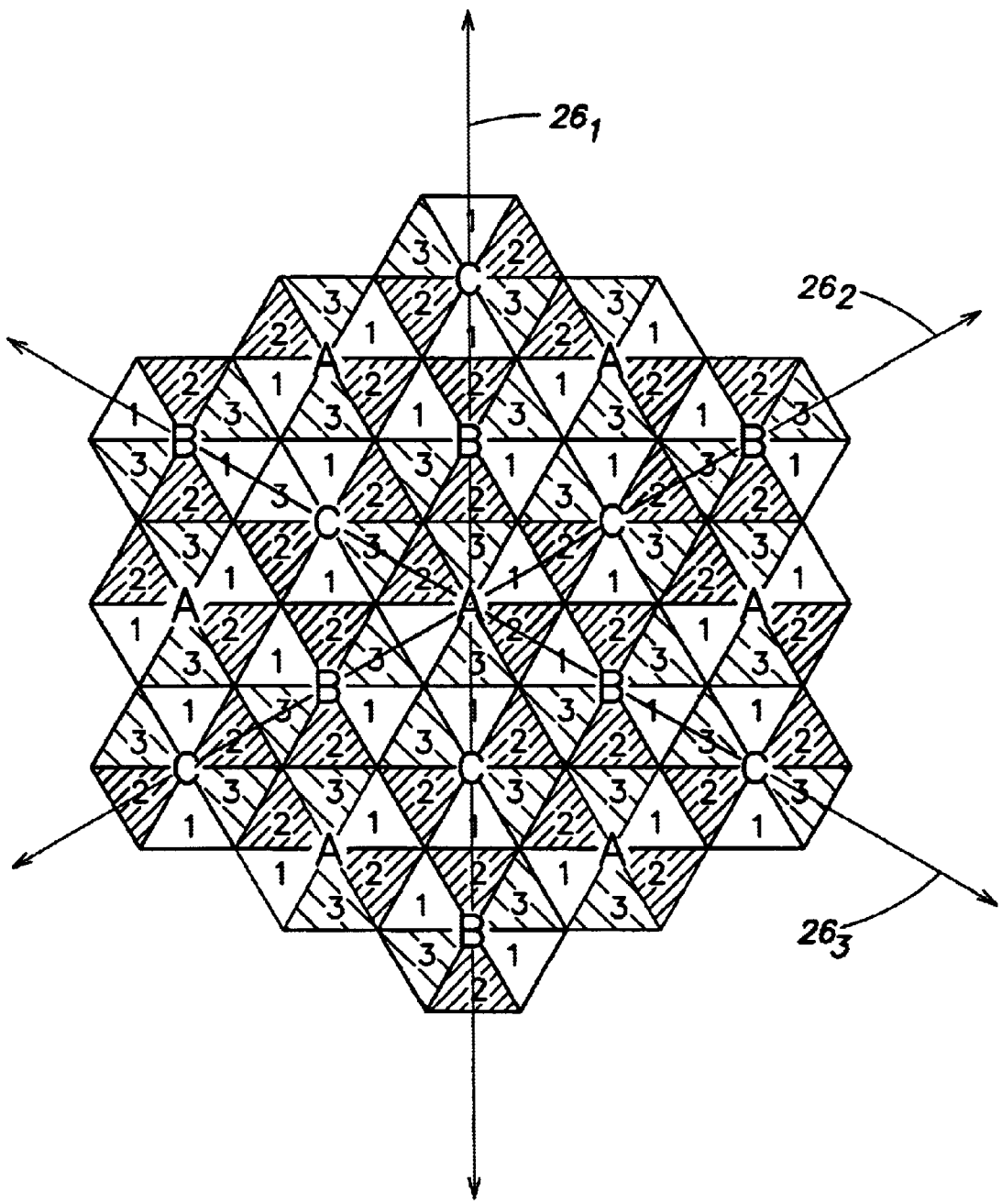
FIG. 8 is a diagram showing a cell arrangement for a coverage area of a wireless communication system based on three different cell configurations each using six sectors per cell, according to one embodiment of the invention.

FIG. 8 is a diagram showing another cell layout using three different cell configurations in a wireless communication system according to one embodiment of the invention. Using the notation described above, the cell layout of FIG. 8 is a 3×6×3 cell layout; namely, each cell is divided into six sectors, and three different full duplex channels are each used twice in each cell. The layout of FIG. 8 demonstrates that, according to one embodiment of the invention, the number of sectors S into which each cell may be divided is equal to any multiple of three, namely 3N, where N is an integer, since a minimum of three different channels need to be employed in each cell to derive three different cell configurations based on relative azimuth orientations of the cells with respect to one another.

FIG. 8 shows that, in general, by dividing each cell into a greater number of sectors S, and using the same number of different channels C in each cell, a greater degree of channel reuse is achieved, thereby conserving the valuable resource of frequency spectrum. FIG. 8 also shows that the number of sectors S used in each cell in turn determines a minimum cell rotation (i.e., 360/S) that is required to obtain three distinct azimuth orientations for the cells. For example, in FIG. 8, the cell configuration B is derived from the cell configuration A by rotating cell configuration A by 60 degrees clockwise (360 degrees/6 sectors). Similarly, the cell configuration C is derived from the cell configuration B by rotating the cell configuration B 60 degrees clockwise. Alternatively, the cell configuration C may be derived from the cell configuration A by rotating the cell configuration A 60 degrees counterclockwise.

An interesting consequence of dividing each cell into six sectors, as shown in FIG. 8, is that the sectors in each cell are oriented approximately along the bore axes of each cell. For example, as shown in FIG. 8, each sector of the center cell 20 is oriented approximately along one of the bore axes $26_1$, $26_2$, and $26_3$. Such an orientation of sectors facilitates an analysis of potential interference in adjacent cells along each of the bore axes in each cell. Since the bore axes of each cell are oriented 60 degrees with respect to one another, it follows that dividing cells into multiples of six sectors allows arrangements of cell configurations having azimuth orientations with respect to one another that facilitate an analysis of potential interference with adjacent cells along each of the bore axes of a given cell.

In view of the foregoing, yet another embodiment of the invention is directed to a wireless communication system having a cell layout of 3×6N×(at least 3), wherein N is an integer. Stated differently, in this embodiment, each cell may be divided into multiples of six sectors, three or more different channels may be used in each cell, and all cells may use the same three or more different channels to derive three different cell configurations based on different azimuth orientations of the cells with respect to each other.

With reference again to FIGS. 1A and 1B, the unique geometry of honeycomb-like arrangements of cells in a coverage area lends itself particularly to arrangements of either three different cell configurations, as shown in FIG. 1A, or seven different cell configurations, as shown in FIG. 1B. As discussed above in connection with FIG. 1B, using seven different cell configurations in the arrangement of cells provides two "buffer" layers of cells between cells using a same configuration (e.g., from the center cell 22 of FIG. 1B shown using configuration F to cells $24_1$–$24_6$ which also use configuration F).

Accordingly, while FIGS. 7 and 8 illustrate examples of wireless communication systems of the present invention using three different cell configurations to reduce potential interference problems between adjacent cells, in a similar manner seven different cell configurations of sectored cells may be utilized to create an expansive arrangement of cells similar to that shown in FIG. 1B, with even greater immunity from potential interference between adjacent cells. In view of the foregoing, it should be appreciated that the variable K in the cell layout notation adopted above typically has values of either 3 or 7.

In a wireless communication system using multiple sectored cells according to one embodiment of the invention, seven different cell configurations may be realized by dividing each cell into at least seven sectors, employing at least seven different channels in each cell, using the same set of at least seven different channels in all of the cells, and arranging the cells using seven different azimuth orientations of the cells with respect to one another. Using the cell layout notation adopted above, the cell layout in this embodiment of the invention may be described as a 7×(at least 7)×(at least 7) cell layout. One issue that arises with respect to dividing cells into seven sectors (or multiples thereof) is that it is difficult to orient sectors approximately along the bore axes of each cell in a predictable and repeatable manner. This situation may lead to some difficulty in analyzing potential interference problems amongst the cells.

In view of the foregoing, yet another embodiment of the invention is directed to a wireless communication system using a cell layout of 7×6N×(at least 7), wherein N is an integer greater than or equal to 2. In this manner, at least seven different cell configurations may be realized using the same set of at least seven different channels in each cell, and rotating the cells accordingly to derive seven different azimuth orientations of the cells with respect to one another. By dividing the cells into multiples of six sectors, the cells may be oriented in the various configurations such that some sectors in each cell are predictably and repeatedly oriented approximately along the bore axes of each cell, so as to facilitate an analysis of potential interference between adjacent cells.

Using the model above, yet another embodiment of the invention is directed to a wireless communication system using a cell layout of 7×24×8. In this embodiment, eight different channels are each used three times in each cell. Since more than seven different channels are used in each cell, at least seven (i.e., and in fact eight) different cell configurations based on seven of eight different possible relative azimuth orientations of the cells with respect to one another are realized. The relative orientations of the cells may be arranged such that at least some sectors of each cell are oriented approximately along each of the bore axes in each cell so as to facilitate an analysis of potential interference amongst adjacent cells.

Figure 9:
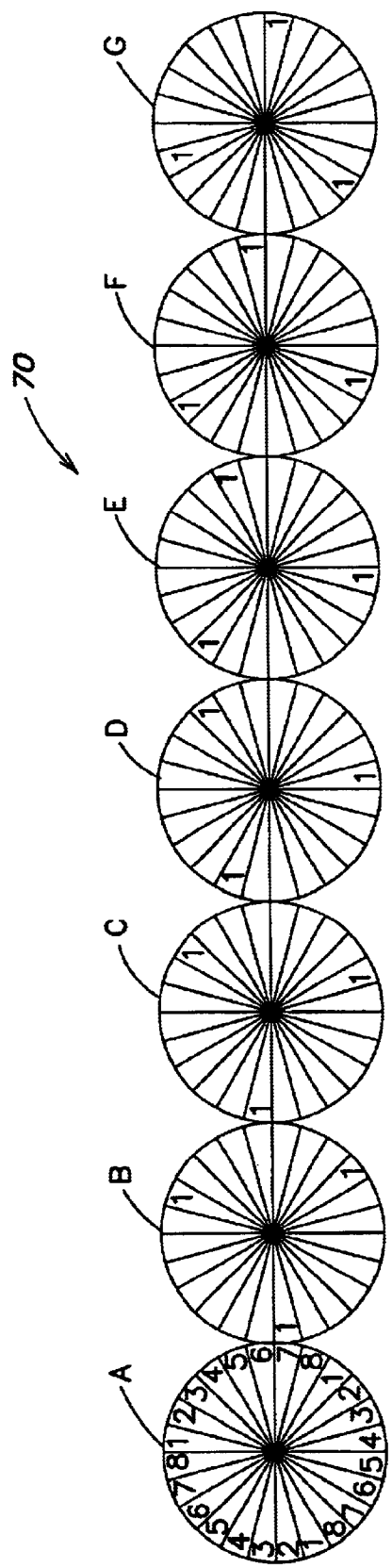
FIG. 9 is a diagram showing seven different cell configurations for use in various cell arrangements in a coverage area of a wireless communication system, according to one embodiment of the invention.

FIG. 9 is a diagram showing a particular example 70 of seven different cell configurations based on different azimuth orientations of the cells in the embodiment described immediately above (i.e., a 7×24×8 cell layout). It should be appreciated that this embodiment of the invention is not limited to the specific cell configurations shown in FIG. 9, and that other cell configurations are possible according to other embodiments. In FIG. 9, each of the 24 sectors of the cell labeled as configuration A is identified with a particular channel type from 1–8. The sequence of channel types 1–8 is repeated three times in each cell. To derive the other cell configurations B–G, the cell configuration A is rotated by 15 degrees consecutively six times. In each of the configurations B–G shown in FIG. 9, those sectors using the channel type 1 are identified so as to clarify the consecutive rotations of the cell configuration A.

Figure 10:
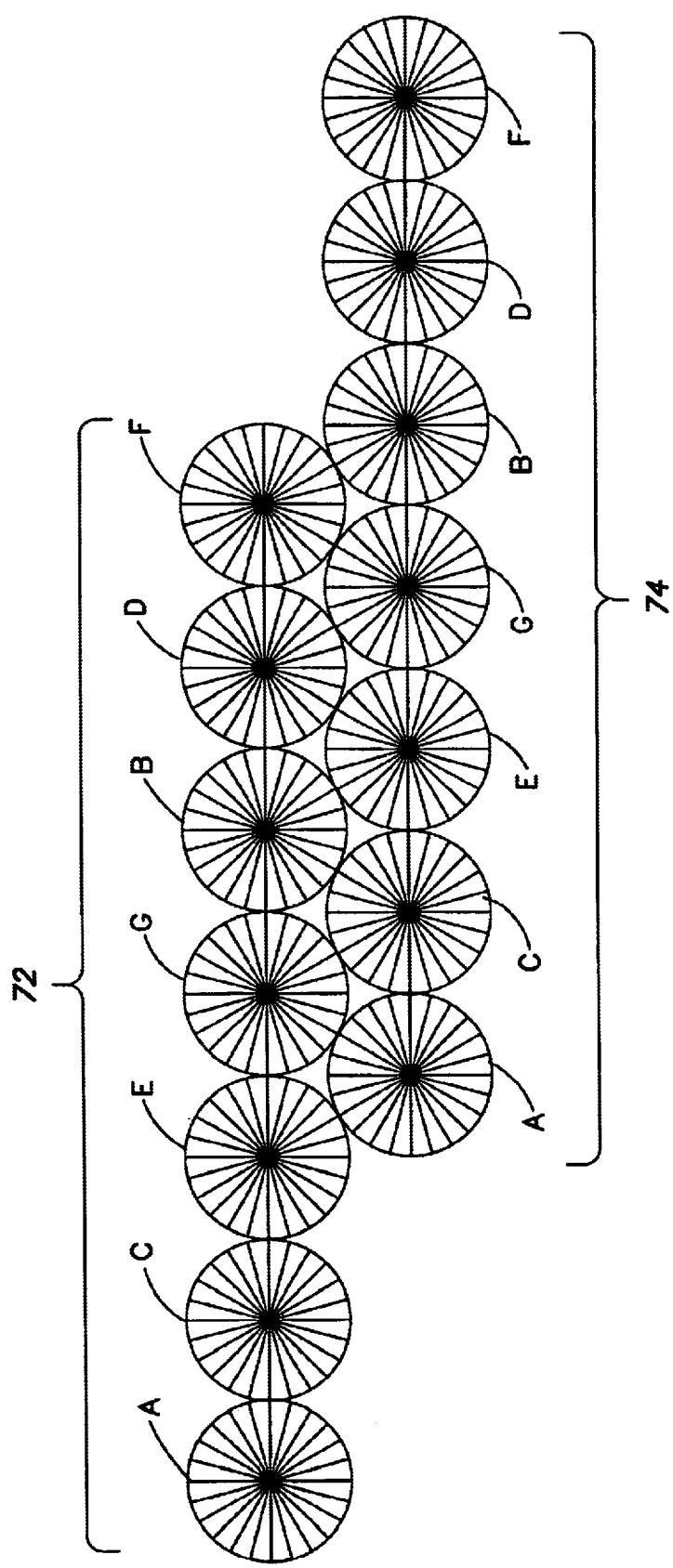
FIG. 10 is a diagram showing an example of one arrangement of cells using the seven different cell configurations of FIG. 9, according to one embodiment of the invention.

FIG. 10 is a diagram showing an arrangement of cells using the seven different cell configurations of FIG. 9, according to one embodiment of the invention. In the arrangement of FIG. 10, the first row 72 is assembled by using the first three alternate configurations of the seven different cell configurations 70 of FIG. 9 (i.e., A, C, E, and G) and then adding the alternate skipped letters to the end of the row (i.e., B, D, and F). The second row 74 of the arrangement of cells shown in FIG. 10 repeats the cell configuration order of the first row 72 (i.e., A, C, E, G, B, D, and F) and is shifted by 2½ positions (i.e., cells) to the right of the first row 72.

Figure 11:
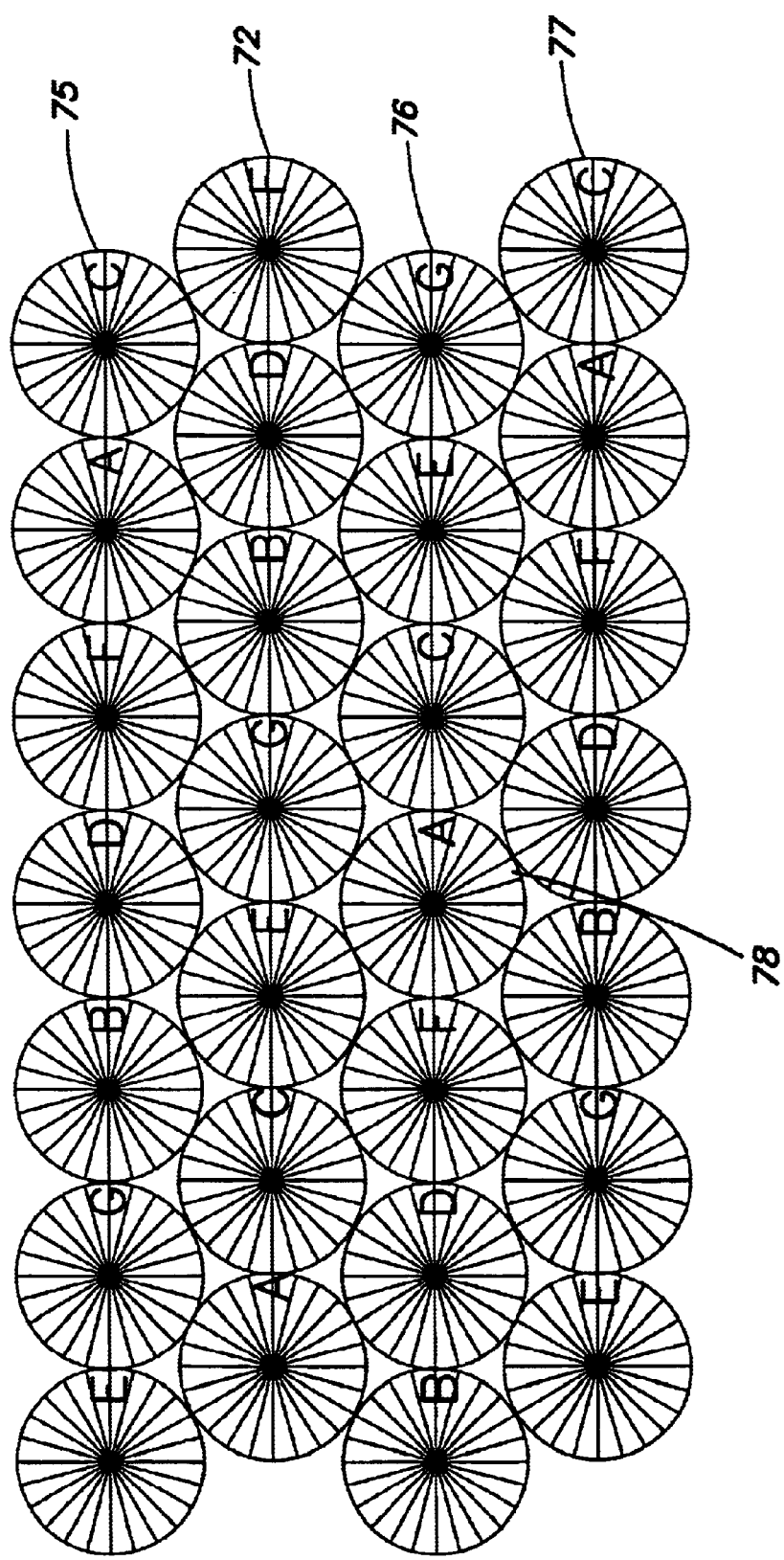
FIG. 11 is a diagram showing an example of one arrangement of cells for a wireless communication system that includes the arrangement of FIG. 10, according to one embodiment of the invention.

FIG. 11 is a diagram showing an arrangement of cells that includes the arrangement of FIG. 10, according to one embodiment of the invention. In particular, FIG. 11 shows the first row 72 of FIG. 10 embedded within three other rows 75, 76, and 77 that each uses the cell configuration order A, C, E, G, B, D, and F in a "wrap around" type fashion, in which each of the rows 75, 76, and 77 begins on the left with a cell configuration different than configuration A. The cell arrangement shown in FIG. 11 alternatively may be viewed as a portion of a larger cell arrangement in which the cell arrangement shown in FIG. 10 is repeated a number of times above and below the rows 72 and 74. For example, starting with the arrangement of cells shown in FIG. 10, another row may be added below the row 74 by repeating the cell configuration order A, C, E, G, B, D, and F and offsetting the row 2½ positions (i.e., cells) to the right. Similarly, a row may be added above the row 72 in FIG. 10 by repeating the cell configuration order of row 72 and offsetting the added row 2½ positions (i.e., cells) to the left. Additionally, an identical sequence of cells having the configuration order of the row 72 may be added to the end of the row 72 shown in FIG. 10 and to the beginning of the row 74 shown in FIG. 10. It should be readily appreciated from a comparison of FIGS. 10 and 11 that FIG. 11 represents a portion of the cell arrangement that results from the foregoing procedure.

Figure 12:
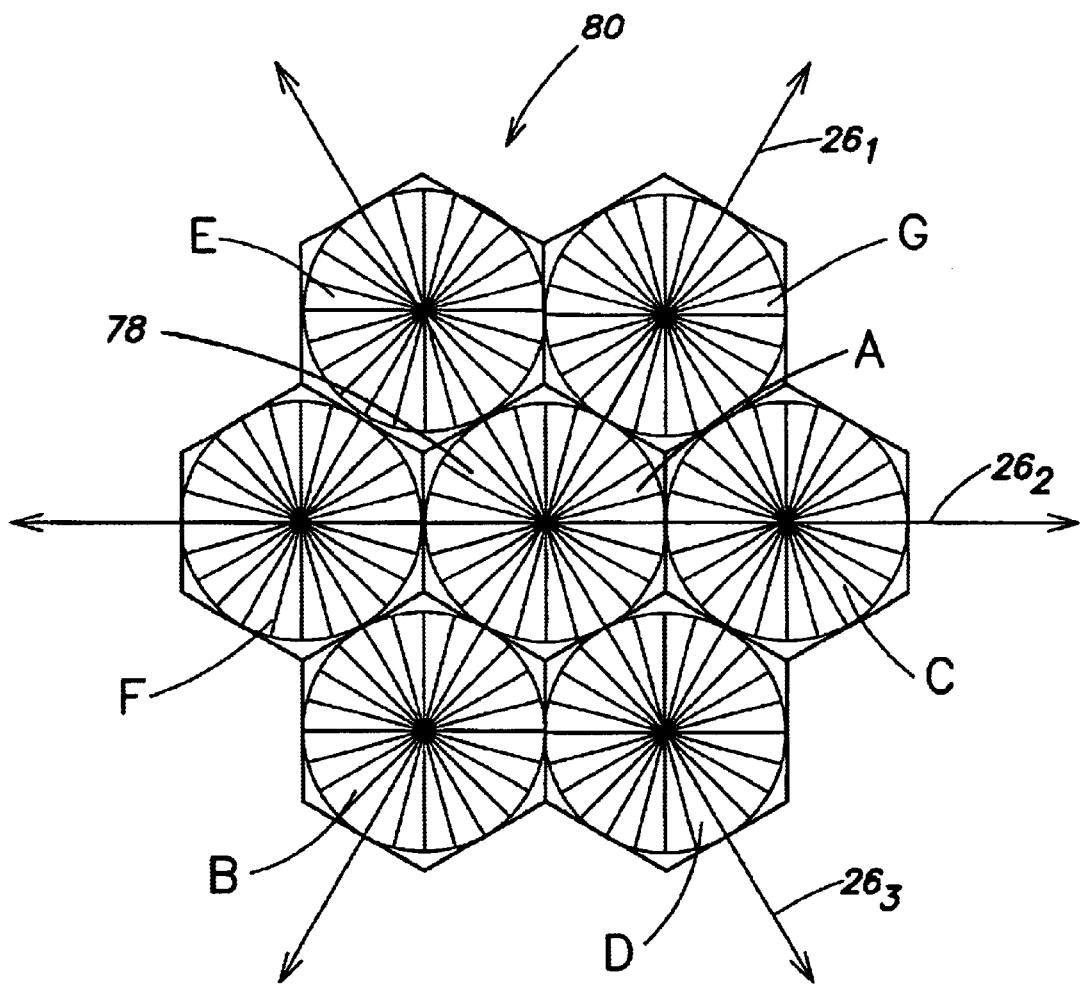
FIG. 12 is a diagram showing an example of a core group of cells of the arrangement of FIG. 11, according to one embodiment of the invention.

FIG. 12 is a diagram showing an example of a core group of cells of the cell arrangement shown in FIG. 11, according to one embodiment of the invention. In particular, the core group 80 shown in FIG. 12 is derived from the cell 78 using the configuration A and the six cells adjacent to the cell 78, as shown in FIG. 11. The seven cell core group in FIG. 12 is illustrated in a manner similar to that of the group of cells shown in FIG. 3, in which the cell 78 of FIG. 12 is represented by the center cell 20 of FIG. 3. As in FIG. 3, the three bore axes $26_1$, $26_2$, and $26_3$ are indicated in FIG. 12, each passing through the cell 78 having the configuration A. From FIG. 12, it may be appreciated that the seven cells of the core group 80 are arranged with respect to each other such that sectors of the cells that are similarly oriented along each of the bore axes $26_1$, $26_2$, and $26_3$, and in which radiation is transmitted in essentially a same direction approximately along each of the bore axes, use different channels.

Figure 13:
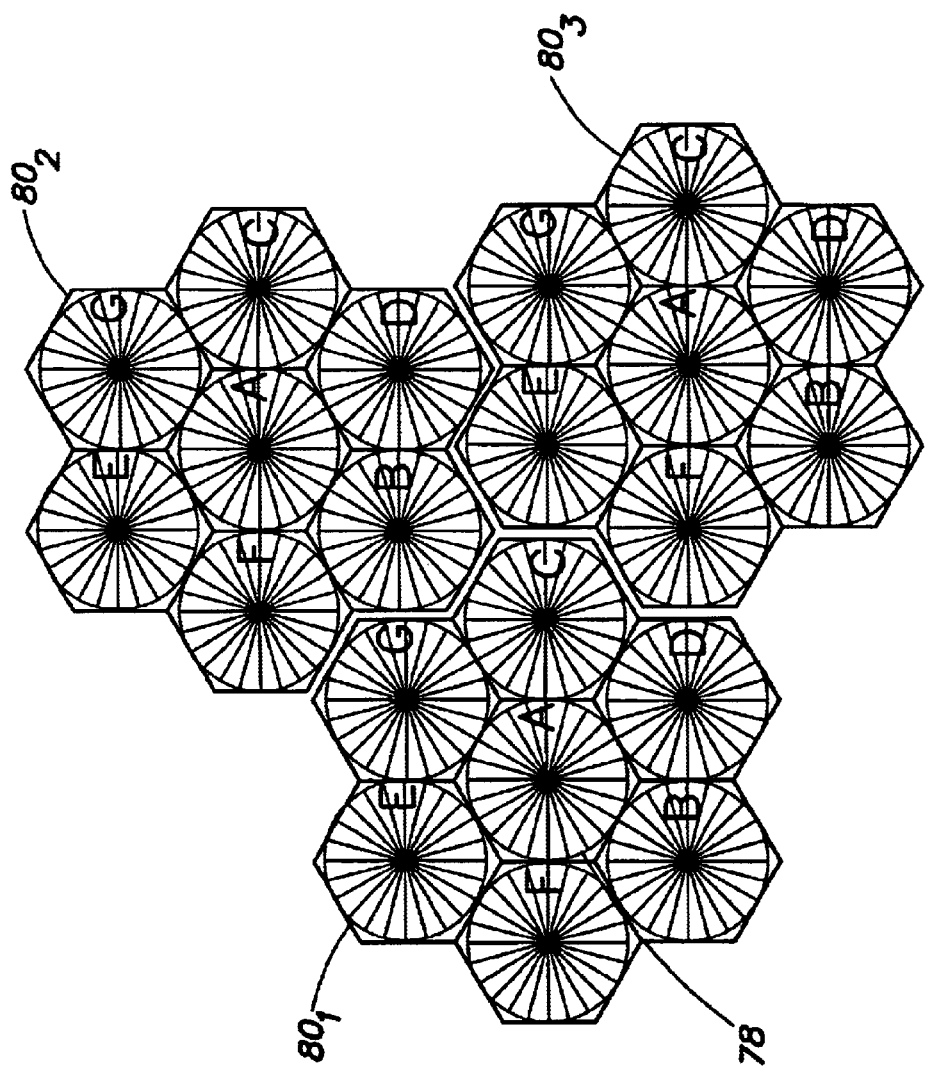
FIG. 13 is a diagram showing an arrangement of cells for a wireless communication system using a number of the core groups shown in FIG. 12, according to one embodiment of the invention.

FIG. 13 is a diagram showing an arrangement of cells for a wireless communication system using a number of the core groups 80 shown in FIG. 12 to build up a larger arrangement of cells, according to one embodiment of the invention. The procedure outlined in FIG. 13 for building up an arrangement of cells using a core group provides an alternative view to understanding the arrangement of cells shown in FIG. 11. Essentially, by using either the "row shifting" procedure discussed above in connection with FIGS. 10 and 11, or by using a number of the core groups 80 of FIG. 12 to build up a cell arrangement as shown in FIG. 13, similar arrangements of cells for a wireless communication system may be implemented. In particular, FIG. 13 shows three core groups $80_1$, $80_2$, and $80_3$, wherein the cell 78 in core group $80_1$ is equivalent to the cell 78 indicated in FIG. 11. From the cell 78 in either of FIG. 11 or 13, it should be appreciated that the relative position of the different cell configurations with respect to the cell 78 is identical in both FIGS. 11 and 13.

Figure 14:
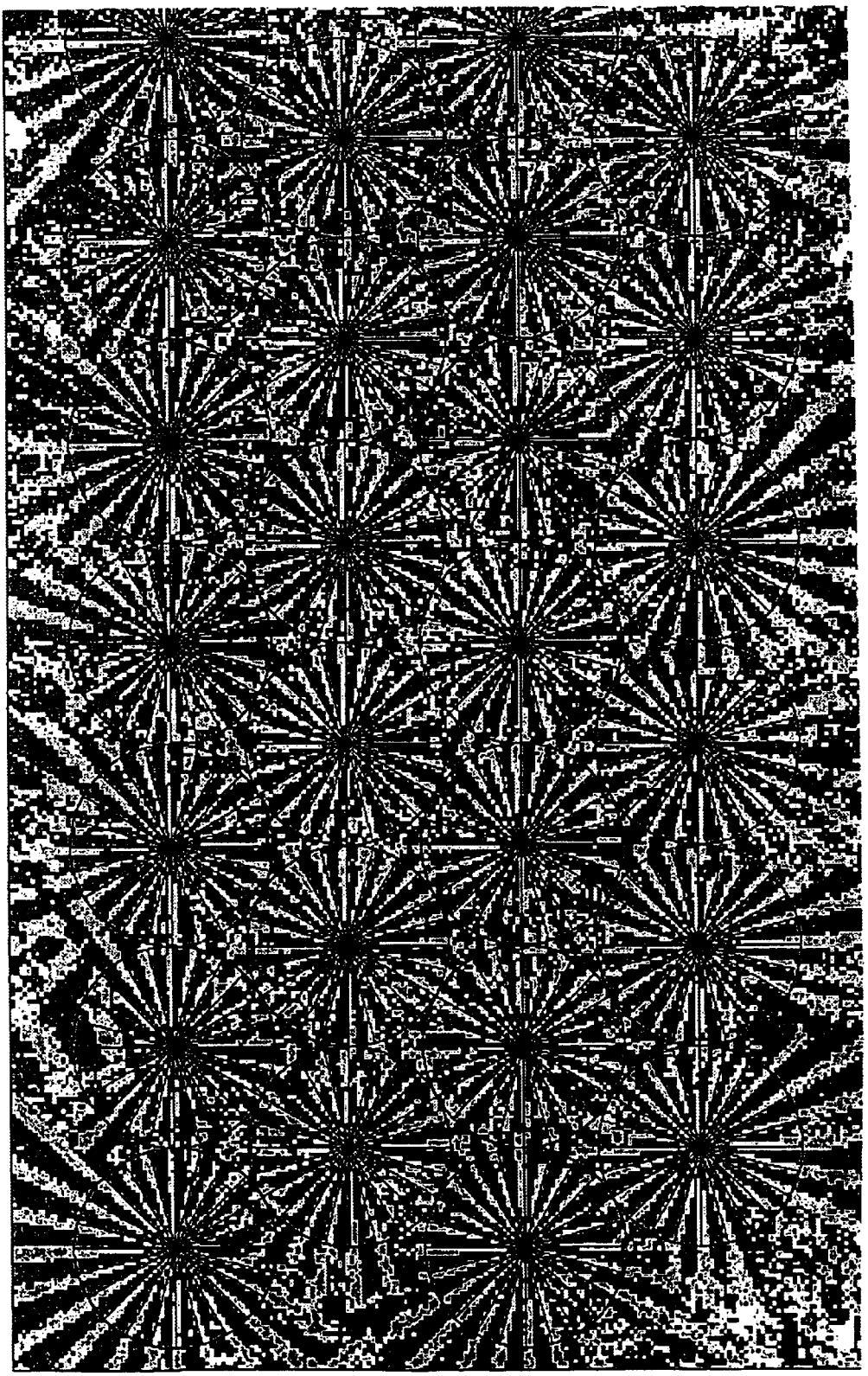
FIG. 14 is a diagram showing results of an interference simulation for a wireless communication system using the cell arrangement of FIG. 11, utilizing terrain, foliage, and groundcover data indicative of an urban/suburban environment.

FIG. 14 is a diagram of an "interference map" showing results of an interference simulation for a wireless communication system using the cell arrangement shown in FIG. 11. The interference simulation producing the results of FIG. 14 models various environmental conditions that the wireless communication system of FIG. 11 likely would encounter in a typical subscriber market. For example, in the simulation, the cell arrangement of FIG. 11 was modeled in a test area containing various terrain, foliage, and groundcover conditions indicative of an urban/suburban environment. The cell arrangement of FIG. 11 was modeled such that the groundcover, foliage, and terrain conditions in the area would impact the coverage and interference potential of the wireless communication system.

The interference map of FIG. 14 represents an exemplary city-scape located in the mid-Atlantic region of the United States, with a dense urban center, a cluster of suburbs, and a less dense forest and plains setting on the fringes of the map. Using particular terrain, foliage, and groundcover data, the interference simulation adds various attenuation values to the radiation transmitted in the sectors of each cell based on the area of the city-scape through which the radiation travels. The interference simulation sets a 25 decibel (dB) information carrier-to-interference ratio (signal-to-noise) requirement in each sector.

In the map of FIG. 14, the darkest pixels in the map (not including the center points of each cell) indicate those areas that do not meet the criterion of a 25 dB carrier-to-interference ratio as a result of the simulation with the terrain, foliage, and groundcover data (i.e., those areas in which interference posed a potential problem). As can be seen from the map of FIG. 14, less than approximately 10% of the area covered by the cell arrangement suffers from potential interference problems. Accordingly, the results of the interference simulation as reflected in the map of FIG. 14 demonstrate that a wireless communication system according to the present invention may be deployed over an expansive coverage area without significant interference amongst neighboring cells.

Having thus described several embodiments of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting.

What is claimed is:

1. A wireless communication system, comprising:
   at least three sectored cells, each cell being divided into 6N sectors, N being an integer, each cell being assigned at least three different channels such that adjacent sectors of the 6N sectors in each cell use different channels, the at least three sectored cells being arranged using at least three different cell configurations, each cell configuration of the at least three different cell configurations being uniquely identified by at least one of a particular azimuth orientation of the cell about a center of the cell and particular channel types of each different channel of the at least three different channels used in the cell, wherein:
   the at least three sectored cells are mutually adjacent and define at least three bore axes, each bore axis of the at least three bore axes passing through a center of each of two cells of the at least three sectored cells; and
   the at least three sectored cells are arranged with respect to each other such that sectors of the at least three sectored cells that are similarly oriented approximately along one bore axis of the at least three bore axes and in which radiation is transmitted in essentially a same direction approximately along the one bore axis use different channels.

2. The system of claim 1, wherein:
   the same at least three different channels are assigned to each cell; and
   each cell configuration of the at least three different cell configurations is uniquely identified by the particular azimuth orientation of the cell about the center of the cell.

3. The system of claim 1, wherein the at least three different channels include at least three different full duplex channels.

4. The system of claim 1, wherein the at least three different channels include three channels having at least one of different carrier frequencies, different polarizations, different time slots, and different codes.

5. The system of claim 1, wherein:
   the at least three different channels include at least three different channel sets, each channel of the at least three different channels including a respective channel set; and
   each respective channel set includes at least one of a plurality of frequency channels, a plurality of time slot channels, and a plurality of coded channels.

6. The system of claim 5, wherein each respective channel set is uniquely identified from other channel sets of the at least three different channel sets as having at least one of a different frequency band and a different polarization than the other channel sets.

7. The system of claim 1, wherein each cell configuration of the at least three different cell configurations is uniquely identified by a particular azimuth orientation of the cell about the center of the cell.

8. The system of claim 1, wherein the at least three sectored cells include at least seven cells, a first cell of the at least seven cells being adjacent with each of six other cells of the at least seven cells such that the six other cells surround the first cell.

9. The system of claim 8, wherein:
   the at least seven cells define a plurality of bore axes, each bore axis of the plurality of bore axes passing through a center of each of two cells of the at least seven cells; and
   the at least seven cells are arranged with respect to each other such that sectors of adjacent cells of the at least seven cells that are similarly oriented approximately along one bore axis of the plurality of bore axes and in which radiation is transmitted in essentially a same direction approximately along the one bore axis use different channels.

10. A wireless communication system, comprising:
    at least seven sectored cells, each sectored cell of the at least seven sectored cells being divided into a plurality of sectors and being assigned at least three different channels such that adjacent sectors in each sectored cell use different channels, each sectored cell of the at least seven sectored cells having a different one of at least seven different cell configurations, each cell configuration of the at least seven different cell configurations being uniquely identified by at least one of a particular azimuth orientation of the cell about the center of the cell and particular channel types of each different channel of the at least three of different channels used in the cell, wherein:
    the at least seven sectored cells include a first cell adjacent with each of six other cells of the at least seven sectored cells such that the six other cells surround the first cell;
    the at least seven sectored cells define a plurality of bore axes, each bore axis of the plurality of bore axes passing through a center of each of two cells of the at least seven sectored cells; and
    the at least seven sectored cells are arranged with respect to each other such that sectors of adjacent cells of the at least seven sectored cells that are similarly oriented approximately along one bore axis of the plurality of bore axes and in which radiation is transmitted in essentially a same direction approximately along the one bore axis use different channels.

11. The system of claim 10, wherein:
each cell is divided into at least seven sectors; and
the at least three different channels include at least seven different channels.

12. The system of claim 11, wherein:
the at least seven different channels include at least seven different channel sets, each channel of the at least seven different channels including a respective channel set; and
each respective channel set includes at least one of a plurality of frequency channels, a plurality of time slot channels, and a plurality of coded channels.

13. The system of claim 12, wherein each respective channel set is uniquely identified from other channel sets of the at least seven different channel sets as having at least one of a different frequency band and a different polarization than the other channel sets.

14. The system of claim 11, wherein:
the same at least seven different channels are assigned to each cell; and
each cell configuration of the at least seven different cell configurations is uniquely identified by the particular azimuth orientation of the cell about the center of the cell.

15. The system of claim 11, wherein each cell is divided into 6N sectors, N being an integer.

16. The system of claim 15, wherein the at least seven different channels include eight different channels.

17. The system of claim 16, wherein each cell is divided into 24 sectors.

18. The system of claim 17, wherein the eight different channels are each reused three times in each cell.

19. The system of claim 18, wherein:
the same eight different channels are assigned to each cell; and
each cell configuration of the at least seven different cell configurations is uniquely identified by the particular azimuth orientation of the cell about the center of the cell.

20. The system of claim 19, wherein each cell configuration of the at least seven different cell configurations has an azimuth orientation of the cell about the center of the cell of 15M degrees with respect to any other cell configuration, M being an integer.

21. The system of claim 10, wherein at least two different cell configurations of the at least seven different cell configurations each is uniquely identified by at least the particular azimuth orientation of the cell about the center of the cell.

22. The system of claim 21, wherein the at least seven sectored cells include a first cell adjacent with each of six other cells of the at least seven sectored cells such that the six other cells surround the first cell, the first cell and the six other cells each using a different cell configuration of the at least seven different cell configurations to form a core sectored cell group.

23. The system of claim 22, wherein the at least seven sectored cells include a plurality of sectored cells arranged as an extended formation of a plurality of core sectored cell groups.

24. The system of claim 10, wherein at least two different cell configurations of the at least seven different cell configurations each is uniquely identified by at least the particular channel types of the at least three different channels used in the cell.

25. The system of claim 24, wherein the at least seven sectored cells include a first cell adjacent with each of six other cells of the at least seven sectored cells such that the six other cells surround the first cell, the first cell and the six other cells each using a different cell configuration of the at least seven different cell configurations to form a core sectored cell group.

26. The system of claim 25, wherein the at least seven sectored cells include a plurality of sectored cells arranged as an extended formation of a plurality of core sectored cell groups.

27. The system of claim 10, wherein each cell configuration of the at least seven different cell configurations is uniquely identified by a particular azimuth orientation of the cell about the center of the cell.

28. A wireless communication system, comprising:
at least two base stations disposed in a coverage area that includes at least two adjacent cells, each cell including a respective plurality of subscriber stations and including at least one base station of the at least two base stations disposed approximately at a center of the cell to exchange information over air with the respective plurality of subscriber stations, at least one base station of the at least two base stations including at least one lens-based sectored antenna system, each cell having approximately a same radius and spanning a 360 degree azimuth angle around the at least one base station, the at least two adjacent cells defining at least one bore axis that passes through the center of each cell, the wireless communication system being constructed and arranged such that:
each cell is divided into at least three sectors;
the at least one base station in each cell exchanges information with the respective plurality of subscriber stations using at least three different channels, wherein adjacent sectors of the at least three sectors in each cell use different channels; and
the at least two adjacent cells are arranged with respect to each other such that sectors of
the at least two adjacent cells that are similarly oriented approximately along the at least one bore axis and in which radiation is transmitted by the at least two base stations in essentially a same direction approximately along the at least one bore axis use different channels;
wherein the at least two base stations include at least three base stations; and the at least two adjacent cells include at least three cells, each cell of the at least three cells being adjacent with at least one other cell of the at least three cells,
wherein the at least three adjacent cells include at least three mutually adjacent cells,
wherein the at least three mutually adjacent cells define at least three bore axes, each bore axis of the at least three bore axes passing through the center of each of two cells of the at least three mutually adjacent cells; and
the at least three mutually adjacent cells are arranged with respect to each other such that sectors of the at least three mutually adjacent cells that are similarly oriented approximately along one bore axis of the at least three bore axes and in which radiation is transmitted by at least two of the at least three base stations in essentially a same direction approximately along the one bore axis use different channels.

29. A wireless communication system, comprising:
at least two base stations disposed in a coverage area that includes at least two adjacent cells, each cell including a respective plurality of subscriber stations and including at least one base station of the at least two base stations disposed approximately at a center of the cell to exchange information over air with the respective plurality of subscriber stations, at least one base station of the at least two base stations including at least one lens-based sectored antenna system, each cell having approximately a same radius and spanning a 360 degree azimuth angle around the at least one base station, the at least two adjacent cells defining at least one bore axis that passes through the center of each cell, the wireless communication system being constructed and arranged such that:
each cell is divided into at least three sectors;
the at least one base station in each cell exchanges information with the respective plurality of subscriber stations using at least three different channels, wherein adjacent sectors of the at least three sectors in each cell use different channels; and
the at least two adjacent cells are arranged with respect to each other such that sectors of the at least two adjacent cells that are similarly oriented approximately along the at least one bore axis and in which radiation is transmitted by the at least two base stations in essentially a same direction approximately along the at least one bore axis use different channels;
wherein:
the at least two base stations include at least seven base stations;
the at least two adjacent cells include at least seven cells, a first cell of the at least seven cells being adjacent with each of six other cells of the at least seven cells such that the six other cells surround the first cell, the at least seven cells defining a plurality of bore axes, each bore axis of the plurality of bore axes passing through the center of each of two cells of the at least seven cells; and
the at least seven cells are arranged with respect to each other such that sectors of adjacent cells of the at least seven cells that are similarly oriented approximately along one bore axis of the plurality of bore axes and in which radiation is transmitted by at least two of the at least seven base stations in essentially a same direction approximately along the one bore axis use different channels.

30. The system of claim 29, wherein each cell is divided into 3N sectors, N being an integer.

31. The system of claim 29, wherein each cell is divided into 6N sectors, N being an integer.

32. The system of claim 29, wherein the at least seven cells are arranged using at least three different cell configurations, each cell configuration of the at least three different cell configurations being uniquely identified by at least one of a particular azimuth orientation of the cell about the center of the cell and particular channel types of each different channel of the at least three different channels used in the cell.

33. The system of claim 32, wherein the at least three different channels include three channels having at least one of different carrier frequencies, different polarizations, different time slots, and different codes.

34. The system of claim 32, wherein:
each base station of the at least seven base stations uses the same at least three different channels; and
each cell configuration of the at least three different cell configurations is uniquely identified by a particular azimuth orientation of the cell about the center of the cell.

35. The system of claim 29, wherein the at least seven cells are arranged using at least seven different cell configurations, each cell configuration of the at least seven different cell configurations being uniquely identified by at least one of a particular azimuth orientation of the cell about the center of the cell and particular channel types of each different channel of the at least three different channels used in the cell.

36. The system of claim 33, wherein the at least three different full channels include three channels having at least one of different carrier frequencies, different polarizations, different time slots, and different codes.

37. The system of claim 35, wherein:
each cell is divided into at least seven sectors; and
the at least three different channels include at least seven different channels.

38. The system of claim 37, wherein:
the at least seven different channels include at least seven different channel sets, each channel of the at least seven different channels including a respective channel set; and
each respective channel set includes at least one of a plurality of frequency channels, a plurality of time slot channels, and a plurality of coded channels.

39. The system of claim 38, wherein each respective channel set is uniquely identified from other channel sets of the at least seven different channel sets as having at least one of a different frequency band and a different polarization than the other channel sets.

40. The system of claim 37, wherein:
each base station of the at least seven base stations uses the same at least seven different channels; and
each cell configuration of the at least seven different cell configurations is uniquely identified by a particular azimuth orientation of the cell about the center of the cell.

41. The system of claim 37, wherein each cell is divided into 6N sectors, N being an integer.

42. The system of claim 41, wherein the at least seven different channels include eight different channels.

43. The system of claim 42, wherein each cell is divided into 24 sectors.

44. The system of claim 43, wherein the eight different channels are each reused three times in each cell.

45. The system of claim 44, wherein:
each base station of the at least seven base stations uses the same eight different channels; and
each cell configuration of the at least seven different cell configurations is uniquely identified by a particular azimuth orientation of the cell about the center of the cell.

46. The system of claim 45, wherein each cell configuration of the at least seven different cell configurations has an azimuth orientation of the cell about the center of the cell of 15M degrees with respect to any other cell configuration, M being an integer.

47. A wireless communication system, comprising:
at least seven base stations disposed in a coverage area that includes at least seven cells, each cell including a respective plurality of subscriber stations and including at least one base station of the at least seven base stations disposed approximately at a center of the cell to exchange information over air with the respective plurality of subscriber stations, each cell having approximately a same radius and spanning a 360 degree azimuth angle around the at least one base station, a first cell of the at least seven cells being adjacent with each of six other cells of the at least seven cells such that the six other cells surround the first cell, the at least seven cells defining a plurality of bore axes, each bore axis of the plurality of bore axes passing through the center of each of two cells of the at least seven cells, the wireless communication system being constructed and arranged such that:

each cell is divided into 6N sectors, N being an integer;

the at least one base station in each cell exchanges information with the respective plurality of subscriber stations using at least three different full duplex channels, wherein adjacent sectors of the 6N sectors in each cell use different full duplex channels; and the at least seven cells are arranged with respect to each other such that sectors of adjacent cells of the at least seven cells that are similarly oriented approximately along one bore axis of the plurality of bore axes and in which radiation is transmitted by at least two of the at least seven base stations in essentially a same direction approximately along the one bore axis use different full duplex channels.

48. The system of claim 47, wherein the at least seven cells are arranged using at least seven different cell configurations, each cell configuration of the at least seven different cell configurations being uniquely identified by at least one of a particular azimuth orientation of the cell about the center of the cell and particular channel types of each different full duplex channel of the at least three different full duplex channels used in the cell.

49. The system of claim 48, wherein the at least three different full duplex channels include three full duplex channels having at least one of different carrier frequencies, different polarizations, different time slots, and different codes.

50. The system of claim 48, wherein:

each cell is divided into at least seven sectors; and the at least three different full duplex channels include at least seven different full duplex channels.

51. The system of claim 50, wherein:

the at least seven different full duplex channels include at least seven different full duplex channel sets, each full duplex channel of the at least seven different full duplex channels including a respective full duplex channel set; and each respective full duplex channel set includes at least one of a plurality of full duplex frequency channels, a plurality of full duplex time slot channels, and a plurality of full duplex coded channels.

52. The system of claim 51, wherein each respective full duplex channel set is uniquely identified from other full duplex channel sets of the at least seven different full duplex channel sets as having at least one of a different frequency band and a different polarization than the other full duplex channel sets.

53. The system of claim 48, wherein:

each base station of the at least seven base stations uses the same at least seven different full duplex channels; and each cell configuration of the at least seven different cell configurations is uniquely identified by a particular azimuth orientation of the cell about the center of the cell.

54. The system of claim 48, wherein the at least seven different full duplex channels include eight different full duplex channels.

55. The system of claim 54, wherein each cell is divided into 24 sectors.

56. The system of claim 55, wherein the eight different full duplex channels are each reused three times in each cell.

57. The system of claim 56, wherein:

each base station of the at least seven base stations uses the same eight different full duplex channels; and each cell configuration of the at least seven different cell configurations is uniquely identified by a particular azimuth orientation of the cell about the center of the cell.

58. The system of claim 57, wherein each cell configuration of the at least seven different cell configurations has an azimuth orientation of the cell about the center of the cell of 15M degrees with respect to any other cell configuration, M being an integer.

59. A wireless communication system, comprising:

K different cell configurations, K being an integer not less than three, each cell configuration of the K different cell configurations including a cell having 6N sectors, N being an integer, each cell using a same set of C different channels to transport information, C being an integer equal to at least K, the K different cell configurations including K different azimuth orientations of the cells with respect to one another.

60. The system of claim 59, wherein each channel of the C different channels is reused R times in each cell, R being an integer.

61. The system of claim 60, wherein $C \times R = 6N$.

62. The system of claim 61, wherein:

K is equal to 7;

C is equal to 8;

R is equal to 3; and

N is equal to 4.

63. A wireless communication method, comprising acts of:

dividing a coverage area into a plurality of cells;

dividing each cell of the plurality of cells into 6N sectors, N being an integer;

assigning a same set of C different channels to transport information in each cell of the plurality of cells, C being an integer; and arranging the plurality of cells using K different cell configurations, K being an integer not less than three, C being equal to at least K, the K different cell configurations including K different azimuth orientations of the cells with respect to one another.

64. In a wireless communication system comprising at least seven sectored cells, each sectored cell of the at least seven sectored cells being divided into a plurality of sectors and being assigned a plurality of different channels such that adjacent sectors in each sectored cell use different channels, a wireless communication method comprising acts of:

using a different cell configuration for each sectored cell of the at least seven sectored cells, each different cell configuration of the at least seven different cell configurations being uniquely identified by at least one of a particular azimuth orientation of a cell about a center of the cell and particular channel types of the plurality of different channels used in the cell;

forming at least one core sectored cell group using the at least seven sectored cells, the core sectored cell group including a first cell adjacent with each of six other cells of the at least seven sectored cells such that the six other cells surround the first cell, wherein the at least seven sectored cells define a plurality of bore axes, each bore axis of the plurality of bore axes passing through a center of each of two cells of the at least seven cells; and arranging the at least seven sectored cells with respect to each other such that sectors of adjacent cells of the at least seven cells that are similarly oriented approximately along one bore axis of the plurality of bore axes and in which radiation is transmitted in essentially a same direction approximately along the one bore axis use different channels.

65. The method of claim 64, wherein the act of using a different cell configuration for each sectored cell of the at least seven sectored cells includes an act of using at least two different cell configurations of the at least seven different cell configurations that are uniquely identified by at least the particular azimuth orientation of the cell about the center of the cell.

66. The method of claim 65, further comprising an act of forming at least one core sectored cell group using the at least seven sectored cells, the core sectored cell group including a first cell adjacent with each of six other cells of the at least seven sectored cells such that the six other cells surround the first cell, the first cell and the six other cells each using a different cell configuration of the at least seven different cell configurations.

67. The method of claim 66, wherein the at least one core sectored cell group includes a plurality of core sectored cell groups, and wherein the method further comprises an act of arranging the plurality of core sectored cell groups as an extended formation.

68. The method of claim 64, wherein the act of using a different cell configuration for each sectored cell of the at least seven sectored cells includes an act of using at least two different cell configurations of the at least seven different cell configurations that are uniquely identified by at least the particular channel types of the plurality of different channels used in the cell.

69. The method of claim 68, further comprising an act of forming at least one core sectored cell group using the at least seven sectored cells, the core sectored cell group including a first cell adjacent with each of six other cells of the at least seven sectored cells such that the six other cells surround the first cell, the first cell and the six other cells each using a different cell configuration of the at least seven different cell configurations.

70. The method of claim 69, wherein the at least one core sectored cell group includes a plurality of core sectored cell groups, and wherein the method further comprises an act of arranging the plurality of core sectored cell groups as an extended formation.

* * * * *